US012691401B2

(12) United States Patent
Brubaker et al.

(10) Patent No.: US 12,691,401 B2
(45) Date of Patent: Jul. 28, 2026

(54) ANNULAR UNFRAMED PLEATED AIR FILTER

(71) Applicant: 3M INNOVATIVE PROPERTIES COMPANY, St. Paul, MN (US)

(72) Inventors: Luke W. Brubaker, Savage, MN (US); Jeffrey A. Chambers, Minneapolis, MN (US); Andrew R. Fox, Oakdale, MN (US); Eric J. Madson, Bloomington, MN (US); Emily K. Maher, Hugo, MN (US); Satinder K. Nayar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 321 days.

(21) Appl. No.: 18/416,166

(22) Filed: Jan. 18, 2024

(65) Prior Publication Data

US 2024/0252971 A1 Aug. 1, 2024

Related U.S. Application Data

(60) Provisional application No. 63/441,299, filed on Jan. 26, 2023.

(51) Int. Cl.
  *B01D 46/00* (2022.01)
  *B01D 46/24* (2006.01)
  *B01D 46/52* (2006.01)
(52) U.S. Cl.
  CPC ....... *B01D 46/523* (2013.01); *B01D 46/2403* (2013.01)
(58) Field of Classification Search
  CPC ............ B01D 46/0005; B01D 46/0015; B01D 46/0049; B01D 46/2403; B01D 46/4227; B01D 46/523; B01D 46/88; B01D 2271/027; B01D 2273/30; B01D 2275/203; B01D 2279/50; B01D 46/521
  USPC .......................................................... 55/356
  See application file for complete search history.

(56) References Cited

U.S. PATENT DOCUMENTS

| | | | |
|---|---|---|---|
| 5,207,812 A | 5/1993 | Tronto et al. | |
| 6,949,155 B1 * | 9/2005 | Lang ................ | B29C 66/81433 156/203 |
| 7,235,115 B2 | 6/2007 | Duffy et al. | |
| 8,419,817 B2 | 4/2013 | Sundet et al. | |
| 2012/0160755 A1 | 6/2012 | Lacroix et al. | |

(Continued)

FOREIGN PATENT DOCUMENTS

| | | |
|---|---|---|
| EP | 1444024 B1 | 6/2011 |
| EP | 3389820 B1 | 11/2021 |

(Continued)

OTHER PUBLICATIONS

Blueair, "Blue Pure—311 Auto/411 Auto: User Manual", 2019, pp. 1-56.

*Primary Examiner* — T. Bennett McKenzie
(74) *Attorney, Agent, or Firm* — Colene H. Blank; Kenneth B. Wood

(57) ABSTRACT

A disposable, annular, unframed, pleated air filter that is in a compacted shape and is openable to a generally cylindrical, ready-for-use shape. The air filter comprises a length of pleated air filter media and at least one adhesive strand, and comprises first and second preferred-bending zones at which the at least one adhesive strand is interrupted.

16 Claims, 11 Drawing Sheets

(56)                    References Cited

U.S. PATENT DOCUMENTS

2015/0113929  A1 *    4/2015   Jackson  ............. B01D 46/2411
                                                      55/482
2023/0330579  A1    10/2023   Gale et al.
2023/0330584  A1    10/2023   Fox et al.

FOREIGN PATENT DOCUMENTS

WO      WO-2022061454  A1 *    3/2022   ......... B01D 46/0015
WO          2023111761  A1     6/2023

* cited by examiner

ANNULAR UNFRAMED PLEATED AIR FILTER

CROSS REFERENCE TO RELATED APPLICATIONS

This application claims priority from U.S. Provisional Application Ser. No. 63/441,299, filed 26 Jan. 2023, the disclosure of which is incorporated by reference in its/their entirety herein.

BACKGROUND

Air filters are often installed in air-handling devices such as room air purifiers to remove at least some fine particles from ambient air e.g. within indoor air spaces such as rooms of houses, condominiums, apartments, offices, and so on.

SUMMARY

In broad summary, herein is disclosed a disposable, annular, unframed, pleated air filter that is in a compacted shape and is openable to a generally cylindrical, ready-for-use shape. The air filter comprises a length of pleated air filter media and at least one adhesive strand, and comprises first and second preferred-bending zones at which the at least one adhesive strand is interrupted. These and many other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular, the dimensions of the various components are depicted in illustrative terms only, and no relationship between the dimensions of the various components should be inferred from the drawings, unless so indicated.

Although terms such as "first" and "second" may be used in this disclosure, it should be understood that those terms are used in their relative sense only unless otherwise noted. As used herein as a modifier to a property or attribute, the term "generally", unless otherwise specifically defined, means that the property or attribute would be readily recognizable by a person of ordinary skill but without requiring absolute precision or a perfect match. The term "substantially", unless otherwise specifically defined, means to a high degree of approximation but again without requiring absolute precision or a perfect match. The terms "outward" and "inward" and related terminology are defined as specifying axes, directions, components, etc., that are respectively radially-outward and radially-inward in regard to an annular air filter and portions and components thereof. The (radially)-inward and (radially)-outward directions and sides of an air filter are pointed out in various Figures herein. By "integral" and like terminology is meant items that, as made, are portions of a single larger entity. This is distinguished from non-integral items (and e.g. non-integral connections), which are obtained by taking separate items and joining them together.

DETAILED DESCRIPTION

Figure 1:
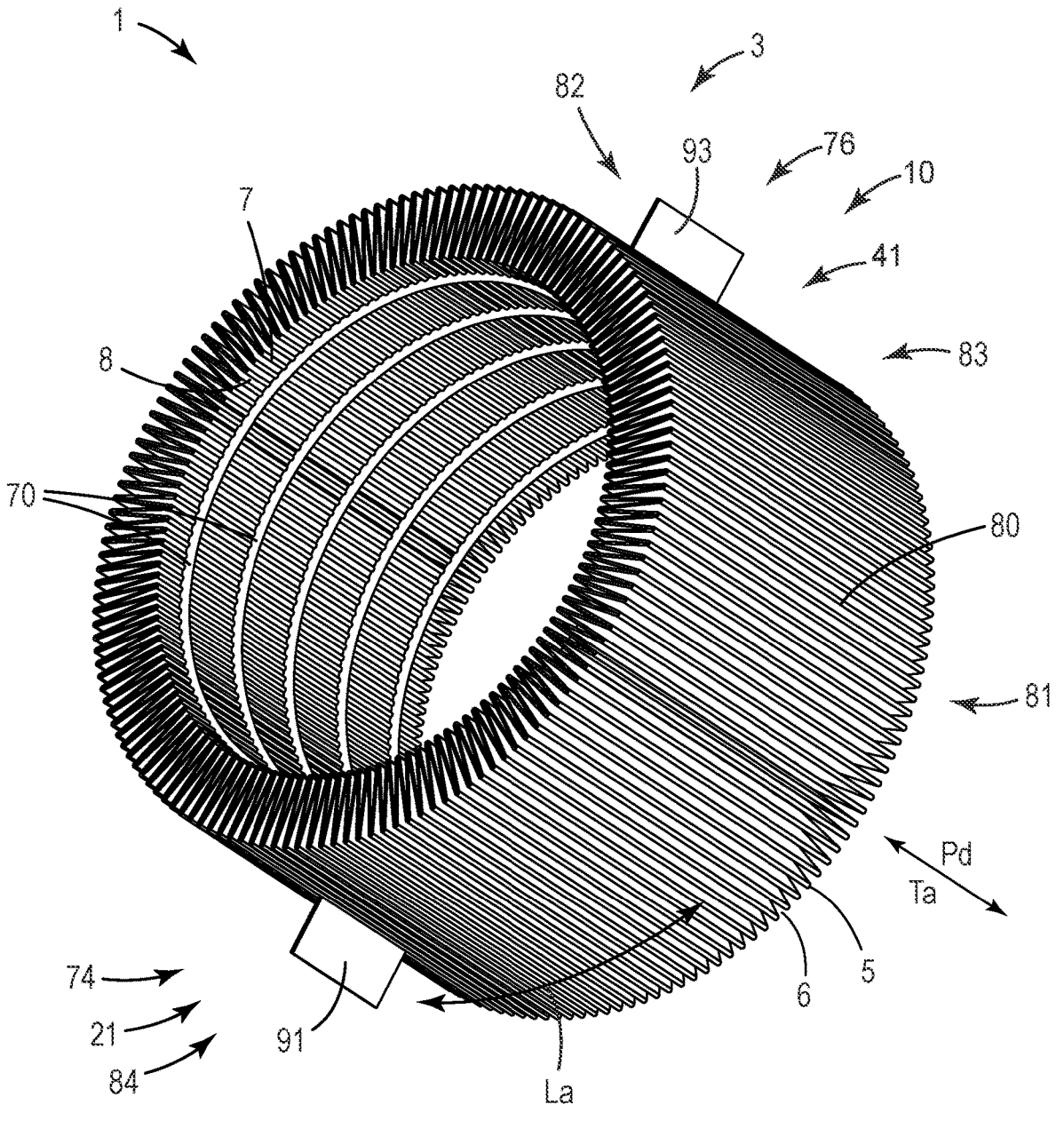
FIG. 1 is a perspective view of an exemplary annular, unframed, pleated air filter, pictured in an opened, ready-for-use, generally cylindrical shape.

Disclosed herein are air filters 1, as depicted in exemplary embodiment in FIG. 1. When in a ready-for-use condition (i.e., in a geometric shape in which it can be installed onto a mandrel of a room air purifier), such an air filter 1 will have a generally cylindrical form (as shown in FIG. 1) and will define an interior air space 4 that is generally cylindrical and that will receive the air that is filtered through the filter media 80 of air filter 1. However, air filter 1 can be provided in a compacted shape (e.g. of the general type depicted in FIG. 5) e.g. for shipping, storage, etc. Such an air filter, that can be transformed between a compacted shape and a generally cylindrical shape, will be referred to herein as an "annular" filter. Regardless of the specific shape that the air filter is formed into at any given time, an annular air filter will exhibit a continuous structure (achieved e.g. by taking a length of pleated filter media and joining the terminal ends of the length of filter media together to form an annular structure as discussed in detail later herein). This can be done in any suitable manner, e.g. by ultrasonically welding one or more panels of one end of the pleated media to one or more panels of the other, opposing end of the pleated media. In various embodiments, any suitable method of joining may be used, e.g. adhesive bonding, mechanical bonding using any suitable mechanical fastener(s), and so on. In some embodiments, multiple such methods may be used, in combination.

Figure 5:
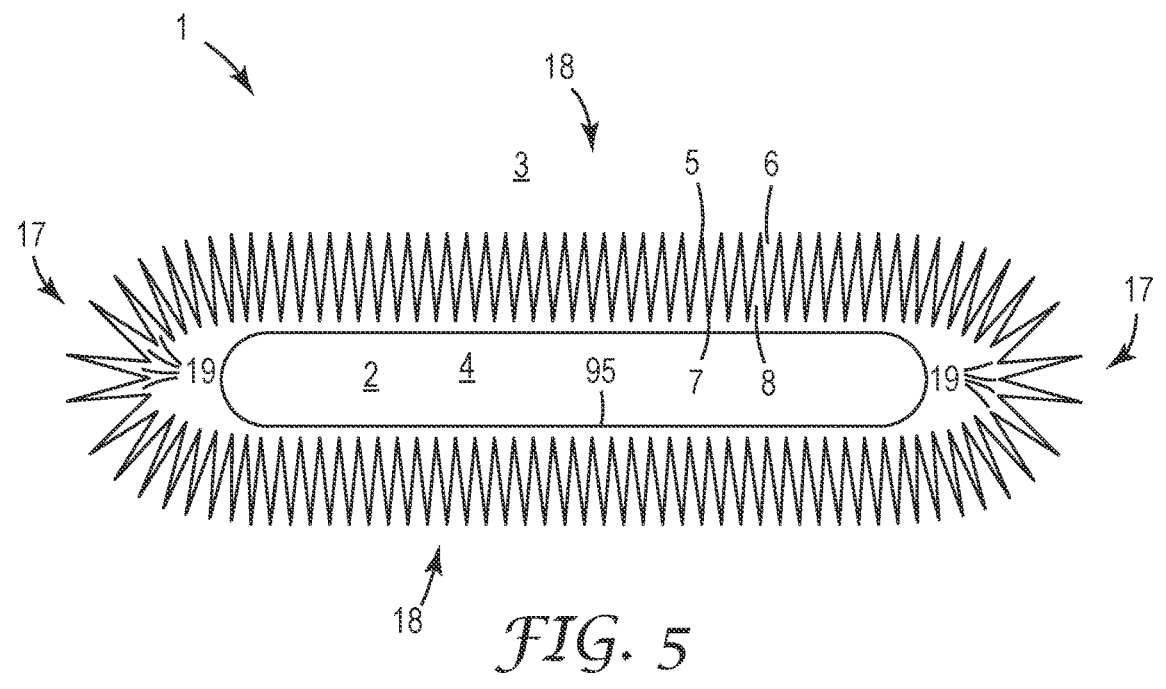
FIG. 5 is a plan view of an exemplary air filter, pictured in a compacted shape.

An annular air filter 1, e.g. as supplied in a compacted shape as in FIG. 5, can be opened into a generally cylindrical shape in which the air filter can be installed in an air-handling apparatus such as e.g. a room air purifier. The annular air filter 1 will comprise an inward major side 2 and an outward major side 3. The annular air filter 1 will comprise a transverse axis (Ta) that is aligned with the pleat direction (Pd) of the pleated air filter media (as indicated in FIG. 1) and will exhibit a transverse width along this axis. Typically, with the air filter installed e.g. in a room air purifier, the transverse axis and pleat direction of the air filter will be aligned with the vertical axis of the room air purifier. In various embodiments, the transverse width of the air filter may be at least 80, 90, 100, 110, or 120 mm; in further embodiments, the transverse width may be at most 350, 300, 250, 200, 180, 160, 150, or 140 mm. Filter media 80 (and thus air filter 1) will exhibit corrugated edges that define the transverse terminal ends of the pleated media (i.e. along the vertical "height" of the air filter as installed in a room air purifier). The air filter will comprise a longitudinal axis La (as indicated in FIG. 1) that corresponds to the longitudinal axis of an elongate length of pleated filter media (as depicted e.g. in FIG. 10.) from which the air filter was formed by joining terminal ends of the elongate length of filter media.

The air filter, when in a ready-for-use, generally cylindrical shape in which it can be installed e.g. on a support mandrel of a room air purifier, will exhibit an inner diameter which may be defined collectively by inward pleat tips 7 of the pleated media, and/or by sections of adhesive strands 70 that are located on the inward pleat tips 7 of the pleated media as discussed later herein. In various embodiments, the inner diameter may be at least 100, 120, 140, or 155 mm; in further embodiments, the inner diameter may be at most 250, 200, 180, 165, or 145 mm. The air filter, when in the ready-for-use shape, will exhibit an outer diameter that is defined collectively by outward pleat tips 5 of the pleated media. In various embodiments, the outer diameter may be at least 140, 160, or 180 mm; in further embodiments, the outer diameter may be at most 280, 250, 220, 200, 180, or 170 mm. (Whatever the specific dimensions, the outer diameter will always be greater than the inner diameter; typically, by a value approximating two times the pleat height, as defined and described later herein.)

By definition, an air filter 1 as disclosed herein is unframed. A pleated filter media 80, and an air filter 1 as a whole, must be unframed in order to allow the air filter and its filter media to be provided in a compacted shape and to be transformable from the compacted shape into a generally cylindrical, ready-for-use shape. By "unframed" is meant that as supplied to an end user (e.g. a homeowner), the air filter media 80, and air filter 1 as a whole, are not equipped with any rigidifying frame or support member or members (whether in the form of discrete members, or with the members being connected to each other) that maintain the air filter in a permanently cylindrical shape. The adhesive strands 70 that are described elsewhere herein do not maintain air filter 1 in a permanently cylindrical shape and thus do not, individually or collectively, constitute a frame. Nor will any adhesive, mechanical fastener, or the like, that may be used to join the ends of an elongate length of air filter media together, be considered to constitute a frame (since such joining only forms the media into an annular shape and does not prevent it from e.g. being compacted).

By definition, an unframed air filter as disclosed herein does not encompass so-called cartridge filters in which a generally cylindrical filter media is at least partially enclosed within a generally cylindrical rigid or semi-rigid support structure, whether in the form of a complete housing, a set of spaced rigid support members, and so on. Further in particular, an unframed air filter does not comprise rigid or semi-rigid endcaps (e.g. in the form of molded, circular or annular pieces) of the general type that are often mounted on the corrugated edges of a cylindrical, pleated filter media. Examples of support frames, housings, endcaps, and the like, that are not permitted on an unframed pleated air filter as disclosed herein, can be found e.g. in U.S. Pat. Nos. 7,628,837 and 8,973,761 and in U.S. Patent Application Publication 2003/0168400.

Figure 2:
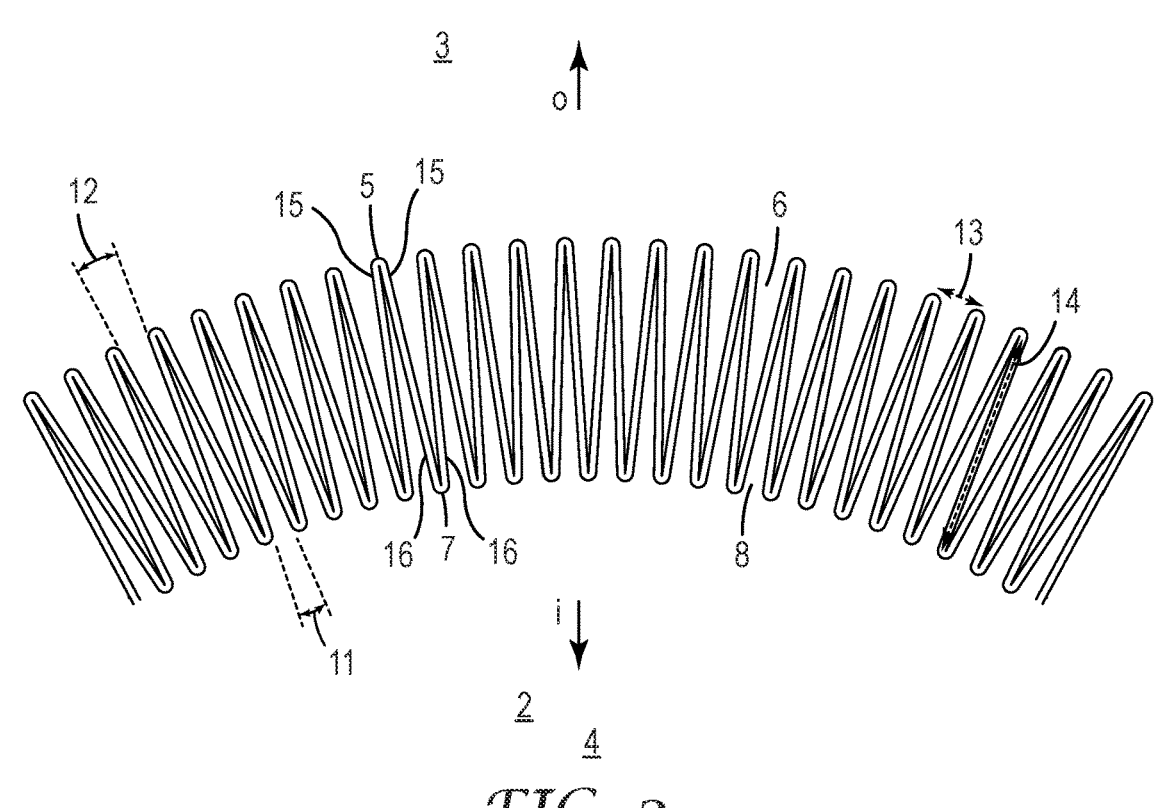
FIG. 2 is a plan view of a portion of an exemplary pleated air filter media of an air filter, viewed along a transverse axis/pleat direction of the air filter.

Air filter 1 is a pleated air filter; by this is meant that the air filter comprises filter media 80 that is pleated into rows of oppositely oriented pleats comprising panels and comprising oppositely-facing pleat tips. As depicted in exemplary embodiment in FIGS. 1 and 2, pleated filter media 80 will comprise outward pleat tips 5 and outward pleat valleys 6 and inward pleat tips 7 and inward pleat valleys 8. The air filter media 80 may be pleated so as to exhibit any suitable pleat geometry. Such pleat geometry may be characterized in terms of various parameters, e.g. the pleat spacing 13 (i.e. the tip-to-tip distance between same-side pleat tips) and the pleat height 14 (i.e. the distance between successive inward and outward pleat tips, along the pleat-panel between these pleat tips), both as indicated in FIG. 2. In various embodiments, the pleat height may be at least 12, 15, 18, 21, or 24 mm; in further embodiments, the pleat height may be at most 35, 32, 29, 26, 23, or 20 mm.

In various embodiments, the pleated air filter media 80 may exhibit a pleat spacing of at least 2.0, 2.5, 3.0, or 3.2 mm; in further embodiments, the pleat spacing may be at most 8.0, 6.0, 5.5, 5.0, 4.5, 4.0, or 3.8 mm. It will be appreciated that when the pleated media is in a generally cylindrical configuration of the type shown in FIG. 1, the pleat spacing of the outward pleat tips 5 will be slightly greater than the pleat spacing of the inward pleat tips 7. By way of a quantitative example, a pleated media e.g. with a pleat height 14 ranging from approximately 20 to 23 mm, when formed into a cylindrical shape as shown in FIG. 1 with an overall outer diameter ranging from approximately 160 to 206 mm, may exhibit an outward pleat spacing of approximately 4.5 mm and an inward pleat spacing of approximately 3.5 mm. (The above-presented exemplary pleat spacings will be measured based on the inward pleat tips.) The outward pleat valleys 6 of the pleated media can be characterized by an outward valley angle 12, and the inward pleat valleys 8 can be characterized by an inward valley angle 11. These parameters (along with the pleat spacing 13) may be characterized with the air filter in the opened, generally cylindrical shape (as in FIGS. 1 and 2). Because these parameters may vary slightly at different locations of the air filter due e.g. to normal statistical variations in manufacturing processes, they will be termed "nominal" values which are most appropriately obtained by averaging of measurements taken at multiple locations of the air filter. (The same is true of the above-described pleat spacing.) Discussions later herein will make it clear that some particular locations of the air filter (e.g. at preferred-bending zones), some pleats may exhibit values of these parameters that differ markedly from those of the majority of the air filter. These "nominal" values will thus be understood to apply to the majority of the pleats of the air filter, with values e.g. at preferred-bending zones being distinguished from such nominal values.

Similar to the above-discussed inward and outward pleat spacings of the inward and outward sides of the pleated media, the nominal outward valley angle 12 may be slightly greater than the nominal inward valley angle 11. By way of a quantitative example, in the exemplary design depicted in FIG. 2, the nominal outward valley angle 12 is approximately 8 degrees and the nominal inward valley angle 11 is approximately 5 degrees. (Because these angles are not measured from a vertex that coincides with the geometric center of the air filter, neither the inward valley angles, nor the outward valley angles, will necessarily sum to 360 degrees over the entirety of the circumference of the air filter.) Again, all such measurements will be made with the air filter in an opened, generally cylindrical configuration.

The pleated filter media 80 will be comprised of a set of pleat-panels; such panels will typically be substantially identical to each other except for particular panels which may receive particular treatment (e.g. may be bonded to each other, etc., as discussed later herein). Two representative pleat-panels 16 that bracket an inward pleat tip 7, and two representative pleat-panels 15 that bracket an outward pleat tip 5, are pointed out in FIG. 2. (As illustrated in FIG. 2, any pleat-panel may serve as both a pleat-panel 15 and a pleat-panel 16.) Each such pleat-panel 15/16 will have an inward side and surface that faces an inward pleat valley 8, and an outward side and surface that faces an outward pleat valley 6. All such pleat-panels 15/16 will be integrally connected to at least one nearest-neighbor pleat-panel, e.g. at an inward pleat tip 7 and/or at an outward pleat tip 5. Most, but not all, of the pleat-panels (excepting e.g. those pleat-panels that are at a joint 10 as discussed in detail later herein) will be integrally connected to two nearest-neighbor pleat panels, one at an inward pleat tip 7 and one at an outward pleat tip 5.

Compactable Air Filter

Not only will an air filter 1 (and its pleated air filter media 80) as disclosed herein be unframed, it will be compactable. By this is meant that the air filter 1 (including its air filter media 80, its adhesive strands 70, and any other constituents) can be reversibly compacted (e.g. at least partially flattened) from a fully cylindrical shape such as shown in FIG. 1, into a compacted shape of the general type illustrated in FIG. 5. By definition, a compactable air filter can be compacted into a shape in which the interior air space 4 defined within the compacted air filter will exhibit a volume that is less than 40% of the nominal volume of this interior air space when the air filter is when its fully cylindrical shape. This volumetric ratio will be referred to herein as a volumetric compaction ratio. For ease of calculation, the nominal volumes used in these evaluations may be calculated using the approximate dimensions defined by the inward pleat tips 7 (and/or any sections of adhesive strands 70 that are present on the inward pleat tips) and will disregard the small volume of air that is present in the inward pleat valleys 8. By way of a specific example, if an air filter with a nominal inner diameter of 12.5 cm when fully cylindrical is compactable to a condition in which it defines an oblong interior air space 4 (of the general shape shown in FIG. 5) of roughly 19×1 cm, the filter will exhibit a volumetric compaction ratio of approximately 15%.

In some embodiments, air filter 1 may be compactable so as to exhibit a volumetric compaction ratio that is equal to or less than 30, 20, or 15%. In some embodiments, the air filter may be compactable so that the volumetric compaction ratio is equal to or less than 10, 5, or even 2%. (The lower limit of the volumetric compaction ratio will be essentially 0%.) Embodiments in which the volumetric compaction ratio is equal to or less than 10% will be referred to herein as the air filter being in a "flattened" configuration (shape). Such an arrangement of an air filter is shown in generic, representative embodiment in FIG. 11. It will be understood that by "flattened" is meant that the volume of air space 4 within air filter 1 is substantially reduced as characterized by the above-described volumetric compaction ratio being less than 10%; it is not meant that the air filter 1 (in particular, the pleated filter media 80) itself is "completely" flattened. That is, as is evident in FIG. 11, the pleat height of the pleated filter media (as defined earlier herein and as indicated by reference numeral 14 in FIG. 2) typically will not be substantially reduced even with the air filter in a flattened configuration.

Typically, an air filter 1 will be formed into a compacted (e.g. flattened) shape at the factory at which the air filter is made. This can allow significant advantages (e.g. cost savings) in the ability to package, ship, and inventory air filters in large quantities. For example, a shipping, storage, and/or retail-display container may include a set of e.g. two, four, six, eight, or more compacted filters, and will occupy far less volume than would be the case if the air filters were not compacted.

An unframed and compactable air filter as disclosed herein can be compacted and stored indefinitely in the compacted condition, and can then be re-opened to its fully cylindrical shape for installation e.g. onto a mandrel of a room air purifier, without causing any damage to the air filter (in particular, its filter media) or any impact on its filtering performance. When viewed along the pleat direction of the pleated air filter as in FIG. 5, a compacted air filter 1 will often exhibit an oblong shape, e.g. an elongated "stadium" shape (such a shape is sometimes referred to as a pill shape or a discorectangle).

When the air filter is in a compacted shape, more centrally-located portions 18 of the compacted air filter may become rather linear in overall shape and may exhibit a pleat spacing that is fairly similar the above-discussed nominal value, as evident in FIG. 5. In contrast, the end portions 17 of the compacted air filter may exhibit a very sharp (small) radius of curvature so that the radially-inward pleat tips are near their nominal pleat spacing or slightly compressed together, and so that the radially-outward pleat tips are at a much larger pleat spacing (e.g. as much as 1.5, 2, 3, 4 or more times the nominal pleat spacing), also as evident in FIG. 5. This may also be characterized as the outward valley angles of the outward pleat valleys being much greater than the inward valley angles of the inward pleat valleys at these locations, also as evident in FIG. 5.

In some embodiments, a spacer 95 (e.g. an oblong, hollow entity made of e.g. cardboard, or an air-filled pillow or a section of bubble wrap) may be inserted into the interior air space 4 of the compacted air filter in the general manner depicted in FIG. 5. This can provide that the air filter media is not compacted to too great an extent or in a manner that permanently distorts the pleated media. Again, the herein-described compaction should not permanently damage the pleated media, should not permanently change the shape of the individual pleats to an unacceptable extent, and so on.

Adhesive Strands

Pleated media 100 will bear at least one elongate strand 70 of hardened adhesive (sometimes referred to as a "glue bead") that exhibits a long axis that is at least generally aligned with the above-described longitudinal axis (La) of the pleated filter media 80. That is, any such adhesive strand will be oriented perpendicular to the pleat direction (Pd) and will extend across multiple pleat tips and valleys, and will be bonded to the surface of at least some portions of the filter media. Such adhesive strands 70 are depicted in FIG. 1 and in several other figures herein. However, adhesive strands are omitted from various Figures so that other details (e.g. of the pleated media) can be more easily seen. In many embodiments, the at least one adhesive strand may take the form of e.g. two, three, four, five or more strands (five strands are shown in the exemplary arrangement of FIG. 1). If multiple strands are present, they may be e.g. parallel to each other and spaced apart from each other along the above-described transverse axis (pleat direction) of the pleated filter media.

Each such strand of adhesive may be formed e.g. by depositing an elongate bead of molten adhesive (sometimes referred to as "drizzle glue") onto the filter media. In some embodiments, the media may be scored and/or temporarily folded into a pleated configuration (so that it will be easier to re-fold the media into the permanent pleated configuration at a later time), then at least partially unfolded e.g. into a planar or nominally-planar configuration, after which the bead of molten adhesive is applied. The media can then be re-folded along the score lines, with the result that the bead of adhesive is retained on the pleated media (and e.g. penetrates at least partially into the pleat valleys) and is allowed to harden to form the strand. The molten adhesive having penetrated at least slightly into the fibrous network of the filter media and/or adhesively bonded to the fibers, the hardened strand is thus securely adhered to the filter media. Methods and arrangements for applying beads of hardenable adhesive in the general manner described above so as to produce adhesive strands, compositions of suitable adhesives, and so on, are described in detail in U.S. Patent 7235115, which is incorporated by reference in its entirety herein.

Any suitable variation of any such adhesive-deposition method may be used. In some such methods, the pleated media may be held in a partially-folded configuration while elongate beads of molten adhesive are deposited thereon. In some embodiments, the pleated media may be held at or near its final, fully-folded configuration during deposition of the molten adhesive, e.g. with the molten adhesive being allowed or encouraged (e.g. by gravity) to flow somewhat into the pleat valleys. In some embodiments, molten adhesive may be disposed onto a transfer entity (e.g. a moving belt) and brought into contact with the pleat tips of the filter media, so that the molten adhesive transfers at least onto the pleat tips.

Any suitable hardenable adhesive may be used to form the adhesive strand(s) disclosed herein. In general, such adhesives may be categorized as hot-melt adhesives, which encompasses any thermoplastic organic polymeric composition that can be disposed (e.g. deposited) on a filter media in a molten or semi-molten (e.g. flowable) condition and hardened to form a stable structure that is adhered to the fibrous material of the filter media. The adhering of the adhesive to the filter media may occur e.g. by way of the adhesive forming an adhesive bond to the surfaces of fibers of the media and/or by way of the adhesive penetrating at least slightly into the interstices of the fibrous network and, after hardening, being mechanically enmeshed within the fibrous network. The term "adhesive" is thus used broadly and does not necessarily require that the adhesive (e.g. after it has cooled and solidified) must exhibit e.g. pressure-sensitive adhesive properties.

An adhesive strand as disclosed herein may comprise any suitable thermoplastic organic polymeric composition, whether based on e.g. a homopolymer, a copolymer, a blend of multiple homopolymers and/or copolymers, and so on. Many potentially suitable hot-melt adhesive compositions are based on e.g. ethylene-vinyl acetate polymers, polyole-fins (e.g. polyethylene, polypropylene, and copolymers thereof), polyamides, and/or blends thereof. Other materials, additives, and so on, may be present, e.g. any of various tackifiers, resins, waxes, plasticizers, and so on. For example, one representative hot melt adhesive (as mentioned in the above-cited US'115 patent) is Hot Melt Adhesive 3748, available from 3M Company, St. Paul, MN, which is disclosed as including polypropylene, polyethyl-ene, ethylene-propylene polymer, styrene-butadiene poly-mer, and polyolefin wax. It will be appreciated that many other potentially suitable compositions are available.

As noted, it may not be necessary that the adhesive composition exhibit pressure-sensitive properties (by way of meeting the so-called Dahlquist criterion, as defined and described in U.S. Patent Application Publication 2017/0292048, which is incorporated by reference herein in its entirety). However, in some embodiments, it may be desired that the adhesive composition is somewhat flexible, rather than brittle, e.g. at room temperature. Thus in various embodiments, the adhesive composition may exhibit a glass transition temperature (as evaluated by differential scanning calorimetry) of less than 30, 25, 20, 15, or 10 degrees C. In some embodiments, the adhesive composition may be a true pressure-sensitive adhesive that satisfies the Dahlquist cri-terion. Any such adhesive composition may be disposed on a filter media in a molten or semi-molten form, by any suitable process. Such deposition may rely on, e.g., a "drizzle" method (e.g. using a so-called grid melter) as mentioned in the above-cited US'115 patent; however, it may also be possible for a suitable molten adhesive com-position to be disposed onto a filter media by extrusion. In some embodiments, a hot melt adhesive composition and deposition apparatus may be configured to deposit the adhesive in a foamed condition.

Such a hardened adhesive strand or strands 70 may act to stabilize the air filter 1; in particular, to definitively maintain the pleat spacing of the inward pleat tips 7. That is, such strands can minimize any tendency of the inward pleat valleys 8 to expand (i.e., to open or spread) in a way that would cause the air filter 1 to not fit snugly onto e.g. a mandrel of a room air purifier. In other words, such adhesive strands 70 can provide that when the air filter is opened from a compacted shape into a ready-to-use, generally cylindrical shape, the air filter will exhibit an inner diameter that is well defined, stable, and is congruent with the outer diameter of the mandrel onto which the air filter is to be installed. Such adhesive strands must however not interfere with the ability to put the air filter into a compacted shape. It may be particularly advantageous for all such adhesive strands to be on the inward side 2 of the pleated media 80 so that the strands do not interfere with previously-discussed ability of the outward pleat tips 5 to expand to a large pleat spacing at the end portions 17 of air filter 1 (commensurate with the tight radius of curvature at those locations) when the air filter 1 is in a compacted configuration as in FIG. 5. As such, in many embodiments, any such adhesive strands 70 may be present on the inward side 2 of the pleated filter media 80, with no adhesive strands 70 being present on the outward side 3 of the media; such an arrangement is depicted in FIG. 1. As discussed elsewhere herein, when installed e.g. onto a mandrel 105, air filter 1 will be positioned radially-outwardly of the radially-outward surface of the mandrel 105. In some embodiments, at least some portions of at least some radially-inward pleat tips 7 of the filter media 80 of air filter 1 may be in contact with the mandrel surface. However, in locations bearing an adhesive strand 70 that includes strand sections 77 that inwardly overlie inward pleat tips 7 as shown in FIG. 3, at least some sections 77 of adhesive strand 70 may be the radially-inwardmost constituents of air filter 1 that are in contact with the mandrel.

In some embodiments, each adhesive strand 70 may be continuous. In such an approach, in the adhesive-deposition process the molten adhesive is applied to the (e.g. temporarily unfolded) filter media 80 continuously, without any breaks. Thus, when the filter media 80 is re-folded into a pleated shape, the adhesive strands 70 will continuously follow the surface of each successive pleat-panel, including penetrating into the inward pleat valleys 8 so as to occupy the deepest portion of each inward pleat valley 8 (excepting any slight statistical variations as may occasionally occur in large-scale adhesive-deposition and media-pleating processes).

Figure 3:
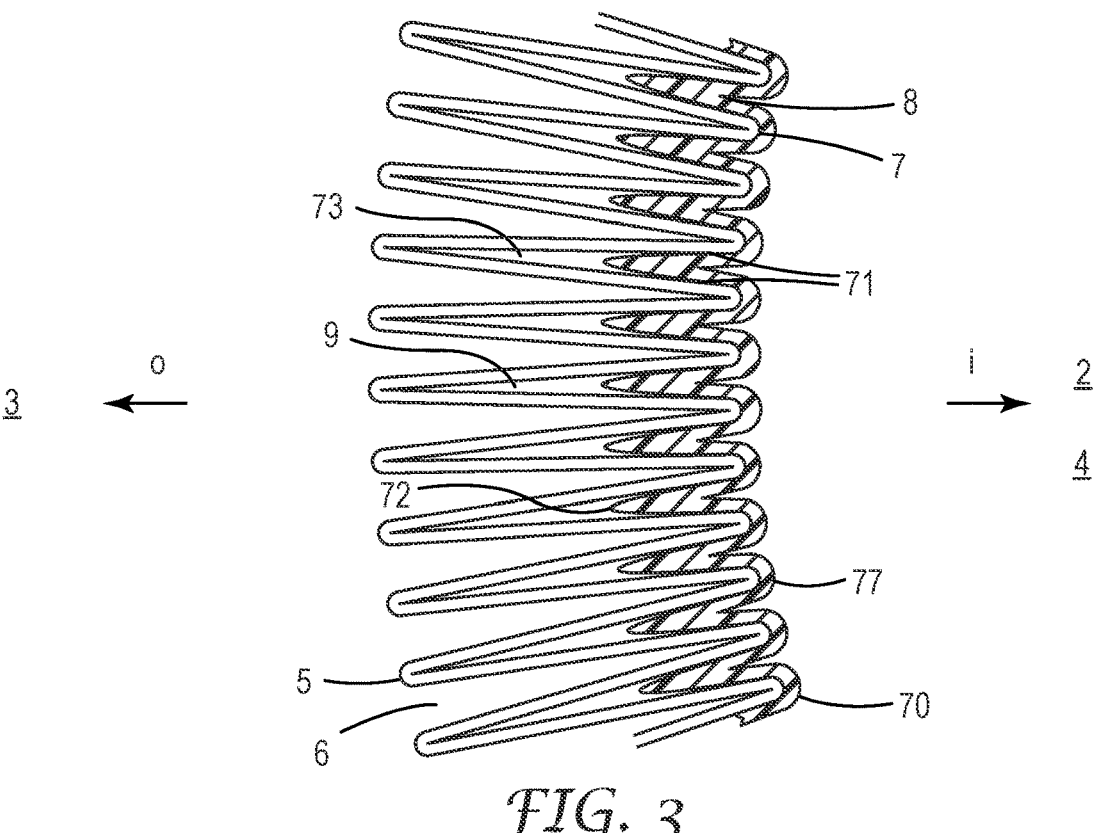
FIG. 3 is a plan view of a portion of an exemplary air filter, viewed along a transverse axis/pleat direction of the air filter.

However, in some embodiments, an adhesive strand 70 may penetrate only partially into the inward pleat valleys 8 so that the adhesive strand exhibits a repeating discontinuous pattern as shown in exemplary embodiment in FIG. 3. In some such arrangements, for each inward pleat valley 8, the adhesive strand 70 will have sections 71 that extend into the valley along the surfaces of the adjacent pleat-panels that define the inward pleat valley, with the adhesive terminating at a point 72 of farthest (in the outward direction) penetration of the adhesive into the inward pleat valley. In such a configuration, the "deepest" (outwardmost) portion 9 of each inward pleat valley may not contain any adhesive, as is evident from FIG. 3.

Such an arrangement may be obtained e.g. by depositing the molten adhesive onto the temporarily unfolded/planar filter media in an intermittent pattern; that is, in discrete segments with gaps therebetween. The deposition pattern may be arranged so that each deposited-adhesive segment is registered with (e.g. centered on) a future inward pleat tip 7 of the (refolded) media. For example, each deposited-adhesive segment may be registered with a score line that has been formed in the filter media and that will dictate the location of an inward pleat tip when the media is refolded. Conversely, each gap in the deposited adhesive may be registered with a future outward pleat tip 5 of the (refolded) media. Such an intermittent deposition of an adhesive strand (often, of several spaced-apart, simultaneously-applied adhesive strands) is sometimes referred to as "stitching" of the adhesive.

When the temporarily folded/planar filter media is refolded and the adhesive allowed to harden, the resulting pleated media will comprise an adhesive strand or strands configured in the general manner described above and depicted in exemplary manner in FIG. 3. Strictly speaking, an "intermittent" adhesive strand may not necessarily have any breaks in the strand itself. Rather, such an adhesive strand may be discontinuous (and may thus exhibit "discontinuities" 73 as indicated in FIG. 3) in the sense that the strand does not continuously follow the surface of each successive pleat-panel and in particular may not penetrate to the deepest portion of each inward pleat valley 8 (again excepting any slight statistical variations as may occasionally occur in large-scale gluing/pleating processes). To avoid any ambiguity regarding the term discontinuous, such an arrangement, in which the adhesive strand does not continuously follow the surface of each successive pleat-panel, will be referred to as an "intermittent" adhesive strand, and will be distinguished from the above-described "continuous" adhesive strand that continuously follows the surface of each successive pleat-panel.

In various embodiments, the degree to which sections 71 of the adhesive strand(s) penetrates into the inward pleat valleys 8 can be established as desired (e.g., by setting the parameters of the adhesive-deposition process), and can be characterized in terms of the percent penetration of the adhesive into the inward pleat valleys. In some embodiments, the point 72 of deepest penetration of adhesive strand 70 into an inward pleat valley 8 may be e.g. at least 10, 30, 50, 70, or 90% of the valley depth; in further embodiments, the point of deepest penetration may be at most 80, 60, 40, or 20%. In some particular embodiments, the penetration depth may range from at least 30 or 40%, to at most 60 or 50%. For such measurements, the valley depth of an inward pleat valley will be considered to be the linear distance along a pleat panel of the pleat valley, from the inwardmost "top" of an inward pleat tip 7 to the outwardmost "floor" of the inward pleat valley 8. (By way of a quantitative example, FIG. 3 depicts an arrangement in which the percent penetration of the adhesive into the pleat valleys, characterized as described above, is approximately 40%.) The presence of the adhesive may also be characterized by the percentage of the total volume of the pleat valley that is occupied by the adhesive. In various embodiments, the percentage of the total valley volume that is occupied by the adhesive may be at least 25, 35, 50, 70, or 90%. In further embodiments, the percentage of the total volume that is occupied by the adhesive may be at most essentially 100%, or 80, 60, or 40%. (In the exemplary arrangement shown in FIG. 3, the adhesive is estimated to occupy approximately 35-40% of the total volume of each inward pleat valley.) It will be appreciated that in any large-scale pleating and adhesive-deposition process, some statistical variation will be present; therefore, any such characterization of an actual product in terms of any of the parameters discussed above should use average values derived from multiple measurements.

In some instances an "intermittent" adhesive strand may not necessarily exhibit a point of deepest penetration 72 that is e.g. as sharp and symmetrical as shown in the idealized depiction of FIG. 3. Rather, due e.g. to the non-instantaneous manner in which flow of molten adhesive can be stopped and re-started using adhesive-deposition equipment, and due to the usual statistical variations present in all such methods and apparatus, some deviations may be present. For example, at a cut-off point, an adhesive section 71 may exhibit e.g. a slight "tail" of adhesive that extends slightly along the surface of a pleat-panel toward the bottom of the pleat valley 8 and that e.g. tapers before disappearing completely. Similarly, when the flow of adhesive is restarted on the opposing pleat-panel, there may be a slight initial surge of adhesive before the flow settles back into a steady state (until the next cut-off). Such subtleties notwithstanding, one of ordinary skill in the art will be readily able to recognize a pleated filter media comprising intermittent adhesive strands as disclosed herein. In some embodiments, it may be possible to use a hybrid arrangement in which the flow of adhesive, rather than being turned completely off in the areas that will form the depths of the pleat valleys, is significantly reduced in these areas, e.g. to no more than 20, 10, or 5% of the nominal value that is used to deposit adhesive in areas proximate the pleat tips. In such embodiments, the adhesive strands may be continuous in the general manner described above, but with the volume of adhesive (as manifested in the cross-sectional diameter or equivalent diameter of the adhesive strands) being drastically reduced toward the "bottoms" of the pleat valleys.

Bridging of Adhesive Strands

In many embodiments, the above-mentioned sections 71 of adhesive that penetrate at least partially into an inward pleat valley 8, will be in a "bridging" arrangement. By this is meant that (with reference to FIG. 3) the adhesive will be deposited so that when the media (which, again, is typically unfolded into a planar configuration for deposition of the adhesive) is re-folded, each two sections 71 of adhesive that are in a particular inward pleat valley 8, will come into contact with each other and self-adhere to each other. The bringing together of adhesive strand sections in this manner will likely be done (i.e. in the factory) while the deposited adhesive is still in an at least semi-molten condition so that opposing sections of the adhesive strand, when they encounter each other, can self-adhere to each other.

Each such section 71 of an adhesive strand 70 is thus adhered to the surface of the pleat panel 16 upon which it was deposited; and, it is adhered to the adjacent section 71 with which it shares the inward pleat valley 8. The adhering of sections of each adhesive strand in this manner (i.e., to the filter media, and the self-adhering between adjacent strand sections that share a pleat valley), can help achieve the above-discussed stabilization of the pleated media. That is, the use of adhesive strands in a bridging arrangement can establish a well-defined, unchanging spacing between the inward pleat tips 7 and can ensure that the inward pleat valleys 8 exhibit inward valley angles 11 that are well-defined and uniform.

Such "bridging" arrangements may be provided whether the adhesive strand(s) is in a stitched/intermittent configuration, or in a quasi-intermittent, hybrid, or continuous configuration. In many embodiments, the adhesive strand(s) will be in a bridging arrangement, regardless of the percent penetration of the adhesive into the pleat valleys and/or the percentage of the pleat valley volume that is occupied by the adhesive. That is, even if the adhesive only occupies e.g. 40% of the total volume of the pleat valley, the opposing sections 71 of the adhesive strand may still be in a bridging configuration (as is the case with the exemplary adhesive strand 70 depicted in FIG. 3).

As discussed above, adhesive strands 70 as disposed e.g. on an inward side 2 of a pleated media 80 of an air filter 1 can achieve various objectives. However, the present investigations have revealed that an unanticipated problem can sometimes occur with the adhesive strands. In particular, adhesive strands 70 that are located at tightly-curved portions 17 of a compacted air filter 1 (as shown in FIG. 5), can sometimes deteriorate, especially when exposed to high-temperature environments for extended periods of time. Sections of adhesive strands 70 generally at locations 19 of tightly-curved portions 17 of a compacted air filter, as illustrated in FIG. 5, are particularly susceptible to such issues. In locations 19, neighboring strand sections that are proximate the inward pleat tips 7 of the pleated filter media 80 will be urged toward, e.g. against, each other when portions 17 of the air filter are tightly-curved in the general manner shown in FIG. 5.

It had not been anticipated that any problems would result from such arrangements, it being expected that the sharp bending of the pleated media in portions 17 would simply press these neighboring strand sections against each other until the strands physically prevented any further bending of the pleated media. It was thus expected that in these locations, the neighboring strand sections would merely experience a slight, inconsequential compressive force. It had thus been envisioned that the adhesive strands 70 would not be affected by the sharp bending of the pleated media in portions 17 that is needed in order to put the air filter into a compacted shape.

However, it was found that strands generally in locations 19 would occasionally delaminate from the surface of the filter media, and/or opposing sections 71 of the strands (as seen in FIG. 3) would separate from each other, and/or the strands might crack. It was thus concluded that some unexpected factor commensurate with the deformation of the filter media and/or the adhesive strands in these locations causes the strands to experience tension, differential shear force, or the like, such that the strands can experience the deterioration described herein.

Interruptions in Adhesive Strands

The present investigations have revealed the above-described problems can be substantially overcome by providing an interruption 74 in the adhesive strand(s) 70 in one or more inward pleat valleys 8 in a portion 17 of the pleated media that is expected to undergo significant bending. Such an interruption 74 is depicted in exemplary, idealized, representative embodiment in FIG. 6. (In many embodiments, multiple, e.g. parallel and spaced-apart, adhesive strands 70 may be present in the general manner shown in FIG. 1; in such cases, all such strands may comprise an interruption 74 located at the same inward pleat valley of the pleated media.) To provide such an arrangement, the deposition of molten adhesive can be interrupted in the desired location during the above-described deposition of molten adhesive onto the temporarily-unfolded filter media.

Figure 6:
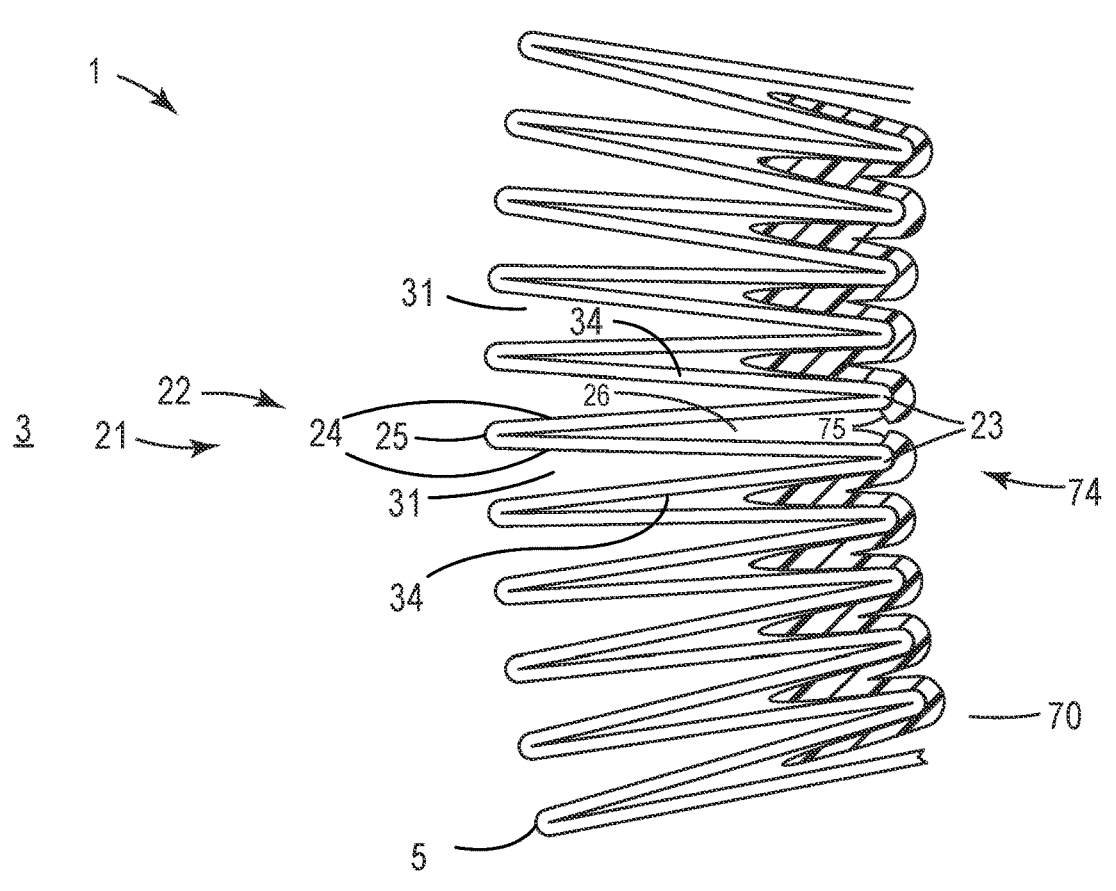
FIG. 6 is a plan view of a portion of an exemplary air filter, viewed along a transverse axis/pleat direction of the air filter and depicting a first preferred bending zone of the air filter and media.

An interruption 74 in adhesive strand(s) 70 can thus be provided at least at one particular inward pleat valley 26 in the general manner indicated in FIG. 6. The pleat 22 that comprises this inward pleat valley 26 will be referred to herein as a "hinge-pleat", for reasons that will become clear later. In some embodiments, an adhesive strand, as interrupted, may exhibit opposing terminal ends 75. In some embodiments, these opposing terminal ends 75 that define an interruption 74 may be approximately aligned with the inward pleat tips 23 that flank the inward pleat valley 26 of the hinge-pleat 22. Thus in some embodiments, at an interruption 74, an adhesive strand 70 may not penetrate far, if at all, into the interior of the inward pleat valley 26 of the hinge-pleat 22.

It will be appreciated that in actual production, terminal ends 75 that define an interruption 74 may not be as abrupt and uniform as shown in the idealized, representative depiction of FIG. 6. Rather (due e.g. to the non-instantaneous manner in which flow of molten adhesive can be stopped and started using adhesive-deposition equipment, and due to the usual statistical variations present in all such methods and apparatus), some deviations may be present. For example, at a cut-off point, an adhesive strand may exhibit a slight "tail" of adhesive that extends slightly along the surface of a pleat-panel 24 into the inward pleat valley 26 and that e.g. tapers before disappearing completely. Similarly, when the flow of adhesive is restarted on the opposing pleat-panel, there may be a slight initial surge of adhesive before the flow settles back into a steady state (until the next cut-off). Such occurrences are allowable and have not been found to undermine the positive effects that such an interruption achieves.

In fact, it has been found that in some instances it may be advantageous for the opposing terminal ends 75 of the adhesive strand 70 to slightly "hook over" the inward pleat tips 23 that flank the inward pleat valley 26 of the hinge-pleat 22, so that the adhesive strand 70 penetrates slightly into the inward pleat valley 26. Such an arrangement is shown in exemplary, generic representation for the strand sections bearing terminal ends 75 that are depicted in FIG. 6. Such an arrangement may, e.g., enhance the ability of the adhesive strand 70 to resist delaminating from the surface of a penultimate pleat-panel 34 that flanks the inward pleat valley 26 and thus may be preferable in some embodiments. However, such arrangements are not envisioned to be necessary in all embodiments (for example, any such tendency toward delamination may be addressed by taking steps to enhance the ability of the adhesive to adhere to the fibers of the filter media). In any event, the use of such arrangements will depend on the degree of fine control over the adhesive deposition that is achievable by any particular adhesive-deposition apparatus and process. Moreover, in some embodiments, the amount and nature of any adhesive that remains in (or in close proximity to) an inward pleat valley 26 of a hinge-pleat 22 may be altered by removing some or all portions of any adhesive that was deposited in the inward pleat valley. In other words, at an interruption in an adhesive strand, the amount of adhesive and/or the geometric arrangement of the adhesive may be achieved by e.g. manually or robotically trimming any already-present adhesive.

Thus in various embodiments, an interruption 74 in an adhesive strand 70 may be configured so that one or both opposing sections of the adhesive strand (i.e., sections that are on opposing pleat-panels, facing each other across the inward pleat valley 26, and that each bear a respective terminal end 75, all as shown in FIG. 6) may penetrate at least somewhat into the inward pleat valley 26. In various embodiments, this distance of penetration into the inward pleat valley may be at least 5, 10, or 15% of the pleat height; in further embodiments, this distance of penetration may be at most 30, 25, or 20% of the pleat height. By way of a specific example, if the pleat height is 20 mm and a section of adhesive strand penetrates 4 mm along the inward surface of a pleat-panel 24 (the distance of penetration being measured from the inward pleat tip 23 to the terminal end 75 of the section of the adhesive strand), the distance of penetration is 20%. In view of these factors, a requirement that an interruption in an adhesive strand is configured so that the adhesive strand does not extend "substantially" into the inward pleat valley, is defined as meaning that the adhesive strand does not penetrate into the pleat valley to a penetration distance that is more than 20% of the pleat height.

In some embodiments, a portion of an adhesive strand 70 may extend still further into an inward pleat valley 26 while still having an interruption as described above. For example, in some embodiments, the flow of molten adhesive, rather than being turned completely off along an area of the filter media that will define the deepest (outward) portion of an inward pleat valley 26 at the location of an interruption 74, may be significantly reduced in this area, e.g. to no more than 20, 10, or 5% of the nominal adhesive flowrate that is used to deposit adhesive in other areas of the filter media. In such embodiments, the resulting adhesive strand may be continuous or quasi-continuous along both pleat-panels that define the inward pleat valley 26, but with the volume of adhesive (as manifested in the cross-sectional diameter or equivalent diameter of the adhesive strand) being drastically reduced, e.g. to no more than 20, 10, or 5% of the volume in other locations. Any such drastically-reduced-volume section of the adhesive strand may be present at least at the very bottom of the inward pleat valley 26 and in various embodiments may extend along no more than 10, 30, 50, or 70% of the pleat height. The transition from the nominal cross-sectional diameter of the adhesive strand, to its sharply-reduced diameter in the "interrupted" sections, may be relatively sharp or may occur by way of a smooth taper.

The above discussions make it clear that the presence of an "interruption" 74 in an adhesive strand 70 does not necessitate that absolutely no adhesive may be present in an inward pleat valley 26 at which the interruption is located. (While any of the above arrangements are possible, a presently-preferred arrangement is one in which the adhesive strand(s) do not substantially penetrate into the inward pleat valley 26 of the hinge-pleat 22.) Rather, in some embodiments some adhesive may be present in the inward pleat valley; what is needed is that the adhesive should not be present in an arrangement (e.g. in the general manner of sections 71 of FIG. 3) in which tight bending of the pleated media will cause the sections of adhesive to be pressed against each other in a manner that would give rise to the problems discussed above. In many embodiments, a distinguishing characteristic of an interruption 74 in an adhesive strand 70 will be the absence, in an inward pleat valley 26 of a hinge-pleat 22, of sections of adhesive strand(s) in a bridging arrangement (noting again that if present, such a bridging arrangement would maintain that particular inward pleat valley at the same nominal pleat spacing and inward valley angle exhibited by the other inward pleat valleys that do contain bridging arrangements).

Discussions later herein will reveal that in many embodiments, subsequent bonding of pleat-panels to make a hinge-pleat may crush an inward pleat valley 26 so that it essentially disappears (e.g., exhibits a pleat valley angle 29 of essentially zero). Accordingly, the various arrangements described above may be most evident before any such bonding is performed.

Hinge-Pleat

As mentioned earlier, a pleat 22 that comprises an inward pleat valley 26 within which any adhesive strands 70 that are present exhibit an interruption 74, is referred to herein as a "hinge-pleat". The herein-disclosed arrangements of hinge-pleats, strand interruptions, and so on, has been found to alleviate the above-discussed problems of adhesive shearing, delamination, cracking, etc. That is, an annular air filter 1 may be held in a compacted condition in the general manner shown in FIG. 5, at high temperatures and for extended times, without encountering an unacceptable amount of deterioration of the adhesive strands in the portions 17 of the air filter that are subjected to pronounced bending. In fact, it has been found that the arrangements presented herein can allow a substantial portion of the bending that must be accomplished in order to put the air filter into a compacted configuration, to be concentrated at the hinge-pleat 22. Thus, the presence of such a hinge-pleat 22 can provide a preferred-bending zone 21 of the air filter, such that in the factory, the air filter may be compacted and packaged with the vast majority of the bending of the air filter occurring in the preferred-bending zone 21.

In other words, a hinge-pleat 22 can serve as a "hinge" at which the vast majority of bending can take place, with other, major sections of the pleated filter media undergoing very little bending. This is the reason that such a structure is designated as a "hinge-pleat". It has been found that in some embodiments, the bending of the air filter can be concentrated at the hinge-pleat of the preferred bending zone to the point that the air filter can be put into a "flattened" shape of the type discussed earlier herein. Such an arrangement is shown in exemplary, idealized, representative embodiment for a portion of an air filter 1 in FIG. 7. As evident from FIG. 7, it has been found that in some embodiments the pleat-panels 24 of a hinge-pleat 22 may be brought close together so that the inward pleat valley 26 of the hinge-pleat 22 exhibits an inward valley angle 29 that is extremely small. Concurrently, the outward valley angles 32 exhibited by the outward pleat valleys 31 that flank hinge-pleat 22 may become extremely large (e.g., far larger than the previously-described nominal outward valley angles 12).

In other words, in some embodiments the vast majority of the bending that occurs when an air filter is flattened, will be concentrated at a hinge-pleat 22, i.e. by way of expansion of outward valley angles 32 of outward pleat valleys 31 that flank the hinge-pleat 22. In various embodiments, an outward pleat valley 31 that flanks a hinge-pleat 22 may, when the air filter is in a flattened shape, exhibit an outward valley angle 32 of at least 30, 50, 70, or 90 degrees. Such an outward valley angle will be much larger than the nominal outward valley angles 12 of the other outward pleat valleys 6, which will often be e.g. in the range of 5-10 degrees as discussed earlier herein. It has been found that when the arrangements disclosed herein are used, the presence of such large outward valley angles 32 will not cause problems.

In some embodiments, a hinge-pleat 22 may become tilted e.g. somewhat upward or downward (when viewed along the pleat direction, as in FIG. 7) rather than extending straight outward. Thus in some embodiments, the outward valley angle of one flanking outward pleat valley 31 may be reduced (e.g. to less than 80, 60, 40 or even 20 degrees), but with the outward valley angle of the other flanking outward pleat valley 31 being increased to a commensurately higher value (e.g. to more than 100, 120, 140, or even 160 degrees). Such occurrences have not been found to cause problems with the air filter.

The providing of interruptions 74 in adhesive strands 70 can thus enable the forming of a hinge-pleat 22 that can not only avoid the problems discussed earlier herein, but can also allow very pronounced bending of the pleated media to be performed at the hinge-pleat, thus allowing the air filter to be put into a flattened shape with commensurate savings in space, shipping costs, and so on. Thus, while the above-discussed problems with the adhesive strands 70 might be addressable in some other way (e.g., by modification of the composition and properties of the adhesive), the herein-disclosed arrangements provide benefits above and beyond merely eliminating the problem as initially faced.

However, providing such an interruption 74 in adhesive strands 70 can cause a phenomenon that must be taken into account. The absence of any adhesive sections 71 in an aforementioned "bridging" arrangement in a hinge-pleat 22, means that the inward pleat valley 26 of the hinge-pleat 22 may be easily able to expand. While this does not pose a problem when the air filter is in the compacted shape (as in FIG. 7), it does raise an issue when the air filter is opened to its generally cylindrical, ready-for-use shape. As shown in FIG. 8, when the air filter is opened into the ready-for-use shape, an inward pleat valley 26 of a hinge-pleat 22 may open to an inward valley angle 29 that is e.g. much wider than the nominal inward valley angle 11 exhibited by the other inward pleat valleys 8 of the pleated filter media. That is, the ability of the other inward pleat valleys 8 to open to an inward valley angle that is wider than the desired nominal inward valley angle 11, is limited by the presence of the bridging adhesive strands. However, this is not the case for the inward pleat valley 26 of the hinge-pleat 22, since it lacks bridging adhesive strands.

Any such opening of the inward pleat valley 26 of the hinge-pleat 22 to a greater-than-nominal inward valley angle 29 (as depicted in FIG. 8) will mean that when the air filter is in its opened shape, the inward diameter of the air filter will be slightly larger than it would be if all of the inward pleat valleys were at the nominal inward valley angle 11. The consequence would be that the opened air filter might not fit snugly onto a mandrel of a room air purifier. In some embodiments, this could be accounted for by designing the mandrel to have a slightly larger outer diameter to allow a snug fit of the inward diameter of the air filter onto the mandrel even with the hinge-pleat of the air filter in a highly-expanded state as in FIG. 8. Such arrangements are possible and are within the scope of the disclosures herein. However, they may be susceptible to variation in the amount that the hinge-pleat expands and/or may detract from the aesthetic appearance of the opened air filter.

Bonded Hinge-Pleat

Figure 7:
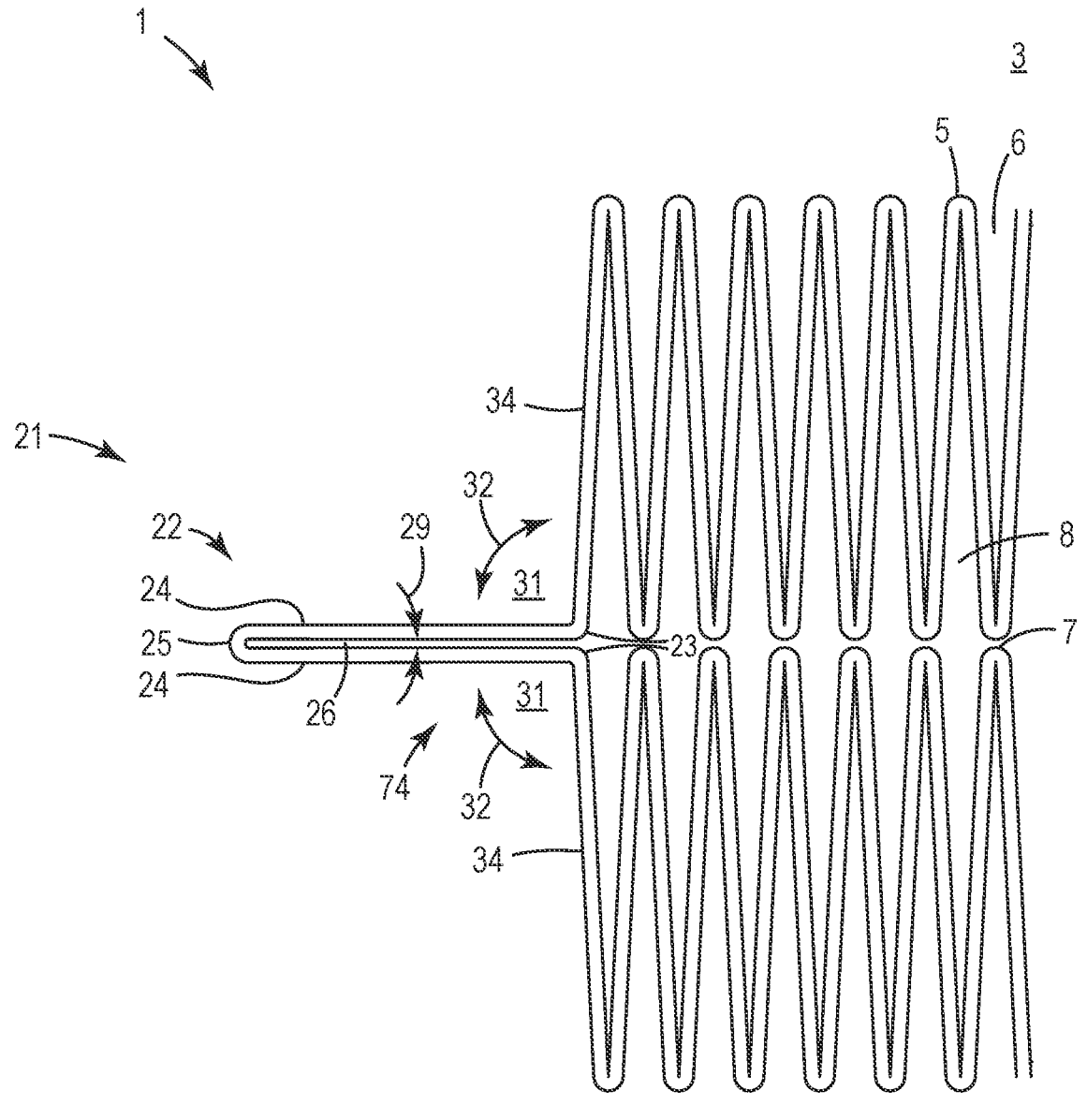
FIG. 7 is a plan view of a portion of an exemplary air filter, viewed along a transverse axis/pleat direction of the air filter and depicting a first preferred-bending zone of the air filter and media, with the air filter and media in a flattened shape.
Figure 8:
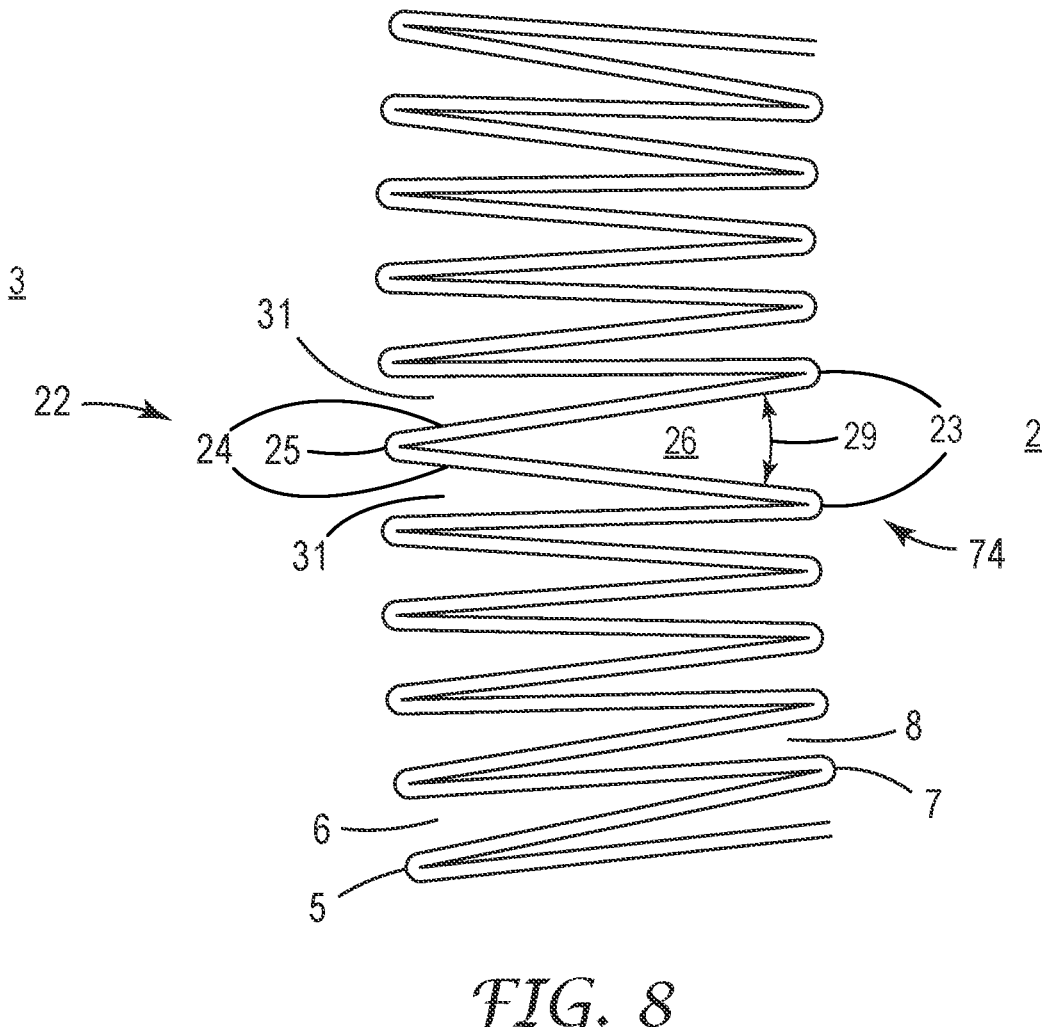
FIG. 8 is a plan view of a portion of an exemplary air filter, viewed along a transverse axis/pleat direction of the air filter and depicting a first-preferred bending zone of the air filter and media, with the air filter and media in an opened, ready-for-use shape.
Figure 9:
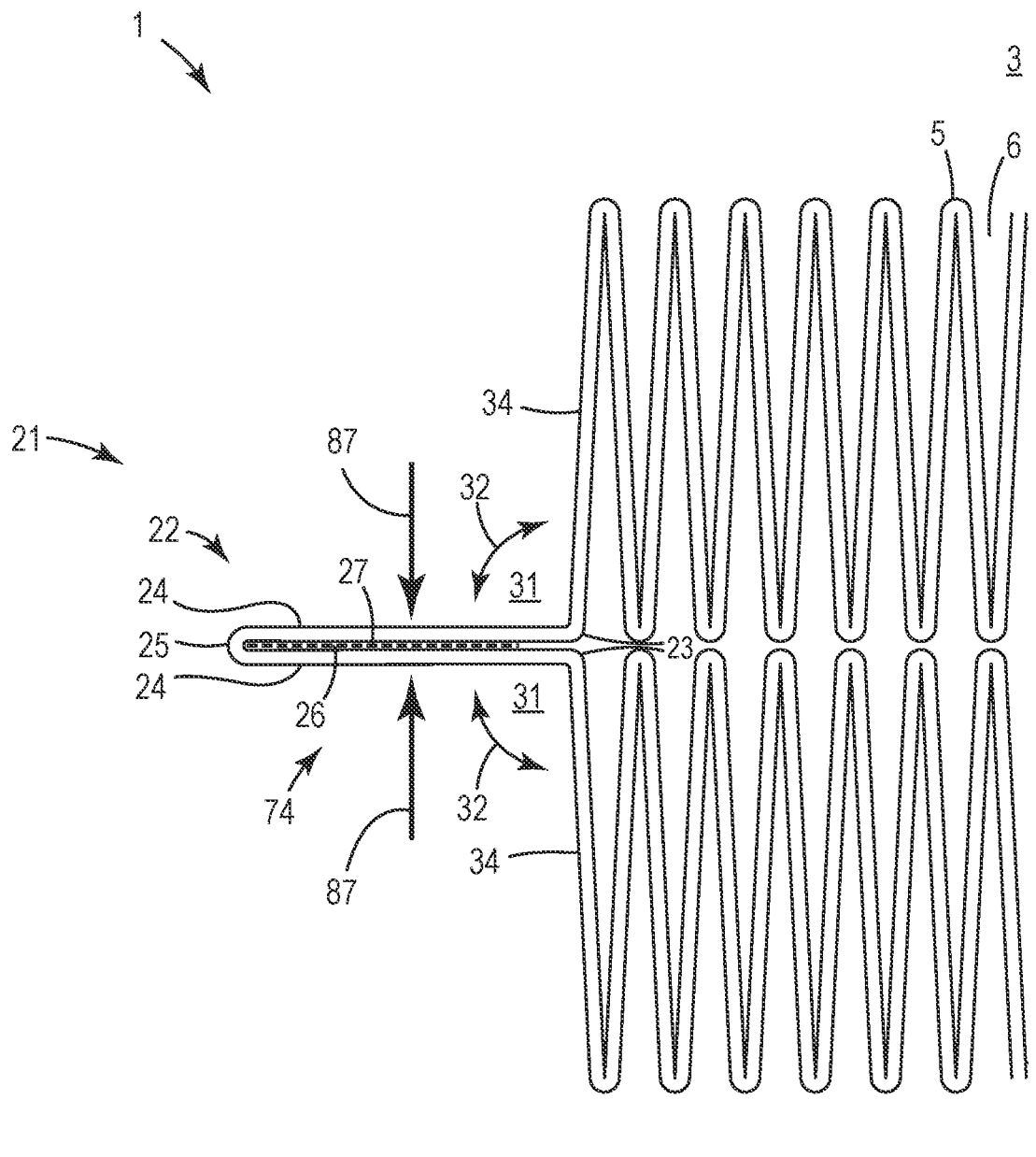
FIG. 9 is a plan view of a portion of an exemplary air filter, viewed along a transverse axis/pleat direction of the air filter and depicting a first, integral preferred-bending zone, with the air filter and media in a flattened shape, and with a hinge-pleat of the integral preferred-bending zone being in a bonded condition.

Thus in some embodiments, the pleat-panels of a hinge-pleat (e.g. pleat-panels 24 of hinge-pleat 22 as shown in FIG. 7) may be bonded to each other at least at some locations of the pleat-panels, to form a bonded hinge-pleat. Such bonding may be performed in a manner that will at least substantially prevent the above-described opening of the inward pleat valley of the hinge-pleat to a wide inward valley angle. In this manner, an air filter can be provided with a well-defined, stable inner diameter that can be matched to the outer diameter of a mandrel onto which the air filter is to be installed. Of course, any such bonding must be accomplished in a way that does not bring back the original, previously-discussed problem resulting from the presence of bridging sections of the adhesive strands in the pleat valley. With reference to FIG. 9, in some embodiments portions of the pleat-panels 24 of a hinge-pleat 22 may be melt-bonded to each other. This may be accomplished e.g. by ultrasonic bonding, by the use of heated platens, and so on. By such methods, the pleat-panels 24 can be brought together (e.g. sandwiched between an anvil and horn of an ultrasonic bonding apparatus, or between heated platens) and into contact with each other in such manner to establish a melt-bond 27 therebetween. Such a melt-bond 27 is indicated by the dashed lines in the slight gap between the pleat-panels 24 in FIG. 9. This is for purposes of illustration; in actuality, the surfaces of the pleat-panels 24 will typically be in direct contact with each other without a gap.

Any such bonding need not necessarily be performed over the entirety of the pleat-panels 24. Rather, in some embodiments such bonding may only need be done in a bonding zone, which is defined as an overall area of the pleat panel within which bonding is performed. Such a bonding zone may be e.g. an outer area of the pleat-panel (as with exemplary melt-bond 27 as shown in FIG. 9), to provide that the bonding does not have any unacceptable affect on portions of the adhesive strand 70 (e.g. its terminal ends 75) that may be in close proximity to the inward pleat tip 23 of the pleat-panel. However, if desired, the bonding may be brought quite close to the inward pleat tips 23, as long as no deleterious effects result from this. Thus in various embodiments, the outer 90%, 80%, 60%, 40%, or 20% of a pleat panel may serve as a bonding zone (noting that the bonding need not necessarily extend to the outermost terminal edge of the pleat, although in many cases it may).

Again, the terminology of a bonding zone refers to an overall area of a pleat-panel that is subjected to bonding. Within such a bonding zone, in some embodiments the actual bonding may only need to be performed on a small fraction of the overall area of the bonding zone. For example, melt-bonding (e.g. as achieved by ultrasonic bonding) may provide ample bonding even if only performed on a small percentage of a bonding zone of a fibrous material. Thus in various embodiments, a bonding zone of a pleat-panel may comprise actual melt-bonds that occupy from at least e.g. 1.0, 2.0, or 3.0, to at most 10.0, 7.0, or 3.0, percent of the bonding zone. In some embodiments, the actual melt-bonds may be in the form of discrete areas (which may be circular, square, diamond-shaped, etc.), or continuous or quasi-continuous lines or blocks of melt-bonded fibers. Discrete melt-bonded areas of this general type are depicted in FIG. 3 of U.S. Patent Application Publication 2021/0229012, which is incorporated by reference in its entirety herein (noting that the melt-bonding in the US '012 document is performed for different reasons than herein, and is referred to only for purposes of illustration).

By way of a quantitative illustration, an outer half of a pleat-panel may serve as a bonding zone. The bonding zone would thus occupy 50% of the overall area of the pleat-panel. Within this bonding zone, the actual melt-bonds may be present as discrete areas (e.g. circles of ~1 mm diameter) that are spaced over the bonding zone (e.g. in a grid pattern, as in FIG. 3 of the US '012 document) and that collectively occupy e.g. from 1 to 4% of the total area of the bonding zone. The above examples are provided for illustration; it will be understood that a bonding zone can occupy any desired portion and/or location of a pleat-panel; and, the actual bonded area(s) may occupy any suitable portion and/or location of a bonding zone. In some embodiments, any such bonding will be non-separable, meaning that once bonded to each other, pleat-panels 24 cannot be separated from each other without destroying or unacceptably damaging the pleat-panels. Such bonding can thus prevent an inward pleat valley 26 of a hinge-pleat 22 from opening to a large angle in the manner discussed above and illustrated in FIG. 8.

Such bonding of the pleat-panels 24 of a hinge-pleat 22 to each other may cause the inward pleat valley 26 of the hinge-pleat 22 to exhibit an inward pleat valley angle (indicated by reference number 29 in FIGS. 7 and 8) that is extremely small (as evident in FIG. 9) and that is permanently held in that condition, regardless of whether the air filter is in a compacted (e.g. flattened) shape or in an opened shape. That is, for a bonded hinge-pleat 22, the inward pleat valley 26 may essentially disappear, so that hinge-pleat 22 may be viewed as being a "flap" rather than a "pleat". Nevertheless, for purposes of description, any such bonded hinge-pleat 22 will still be referred to by the terminology "pleat", with the understanding that in some cases the hinge-pleat may not exhibit an inward pleat valley with a non-zero inward valley angle.

Such nuances notwithstanding, in many embodiments the inward pleat valley 26 of a bonded hinge-pleat 22 may exhibit an inward valley angle 29 that is far smaller than the nominal inward valley angle 11 of the other inward pleat valleys 8 of the other (non-hinge) pleats of the air filter. In various embodiments, the inward pleat valley 26 of a hinge-pleat 22 may exhibit an inward valley angle 29 that is less than 60, 40, 20, 10, or 5% of the nominal inward valley angle 11 of the non-hinge-pleat inward pleat valleys 8. For example, the other, non-hinge-pleat inward pleat valleys 8 may exhibit inward valley angles 11 of approximately 5 degrees as in the arrangement of FIG. 2, with the hinge-pleat 22 having an inward valley 26 which exhibits an inward valley angle of approximately zero degrees, as in the arrangement of FIG. 9.

Based on the above discussions, an ordinary artisan will be easily able to recognize a bonded hinge-pleat as defined and described herein. In a bonded hinge-pleat, any small amount of adhesive strand(s) that may have been present in the inward pleat valley may be e.g. flattened and/or dispersed by the bonding process. This will be of no consequence as long as the amount of adhesive is sufficiently small that the adhesive does not interfere with the bonding, the adhesive is not ejected from the inward pleat valley in sufficient quantity to cause problems, and so on.

In many embodiments, an ultrasonic bonding process (or the use of heated platens) may be convenient for bonding two (or more) pleat-panels together via melt-bonding. However, any other suitable process and/or bonding apparatus or combination thereof may be used. Thus for example, one or more mechanical fasteners (e.g. staples) may be used. It is possible that the same adhesive that is used to form the adhesive strands 70 may be used, e.g. by depositing a very small parcel of the adhesive into the outer portion of the pleat valley such that the adhesive bonds to the inward-face surface of each pleat-panel in that outer portion of the pleat valley. However, this should only be done if the adhesive-deposition process can be finely controlled such that adhesive can be deposited in this manner, without any adhesive being deposited in such a manner as might give rise to the problems discussed earlier herein. Such an arrangement is encompassed within the present disclosure. However, in many embodiments, the adhesive that is used for the adhesive strands will not be used for the bonding the pleat-panels of the hinge-pleat; rather, the bonding to form a bonded hinge-pleat will be achieved in some other way.

The above-described arrangement, as illustrated in FIG. 9, involves bonding two pleat-panels 24 to form a bonded hinge-pleat 22, with the interruption 74 in the adhesive strand(s) being positioned at these two pleat-panels. The resulting hinge-pleat has two layers (that are bonded together), corresponding to the two pleat-panels 24. In some embodiments, a hinge-pleat may be derived from more than two pleat-panels. For example, an interruption 74 in the adhesive strand(s) may span four (consecutive) pleat panels, with all four pleat panels being gathered and bonded together to form a four-layer bonded hinge-pleat.

Integral Hinge-Pleat and Preferred-Bending Zone

The above-described arrangement is one in which two (or, in some cases, more) consecutive pleat-panels 24 are bonded together to form a bonded hinge-pleat 22. The above-described bonding is not for the purpose of connecting the pleat-panels 24 to each other, since they are already integrally connected to each other at their common outward pleat tip 25. Rather, the bonding is for the purpose of preventing the inward pleat valley 26 of the hinge-pleat 22 from opening up excessively (or at all) when the air filter is opened into its ready-for-use shape. An arrangement in which pleat-panels that are bonded together are consecutive, are already integrally connected to each other when bonded, and that remain integrally connected to each other after being bonded, will be referred to herein as forming an "integral" hinge pleat 22 so as to provide an "integral" preferred-bending zone 21.

Figure 11:
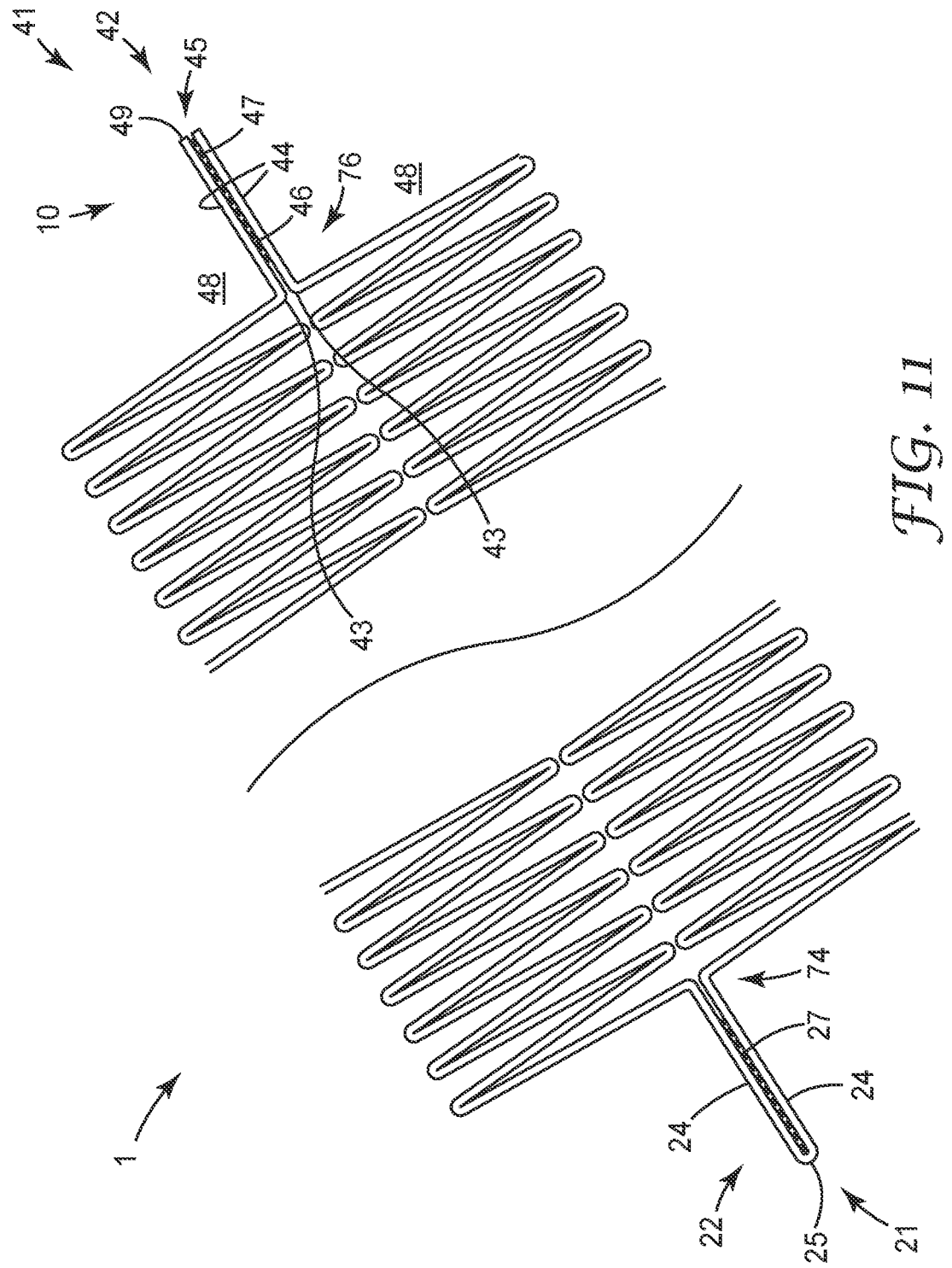
FIG. 11 is a plan view of portions of an exemplary air filter, viewed along a transverse axis/pleat direction of the air filter with the air filter and media in a flattened shape, and depicting a first, integral preferred bending zone and a second, jointed, non-integral preferred bending zone.

It will be appreciated e.g. from inspection of FIG. 5 that two preferred-bending zones are required in order for an annular pleated air filter to be compacted or flattened. Such preferred-bending zones may be diametrically opposed along the length of the annular air filter, e.g. they will be 180-degree opposed in the opened air filter, in the manner of preferred-bending zones 21 and 41 of air filter 1 as depicted in FIGS. 1 and 11. In some embodiments, one such preferred-bending zone may be an "integral" preferred-bending zone 21 as described extensively above.

Jointed, Non-Integral Hinge-Pleat and Preferred-Bending Zone

To obtain a second, diametrically-opposite preferred-bending zone, advantage may be taken of the way in which an annular air filter can be conveniently assembled. Specifically, a continuous, elongate length of pleated media may be obtained, and may be cut into predetermined elongate lengths. For each thus-formed elongate length of pleated media, the cut ends of the elongate length of media can be joined together to make a joint 10 as indicated in FIG. 1. A "joint" is defined herein as comprising at least two pleat panels that were at opposing ends of a discrete length of pleated filter media and thus were not consecutive and were not (directly) integrally connected to each other, with the at least two pleat panels being bonded together to join opposing ends of the length of pleated filter media together to turn the length of pleated media into a continuous, annular shape. Such a procedure, as used to form a joint 10, can be leveraged to form a second preferred-bending zone 41, located diametrically opposite a first (e.g. integral) preferred-bending zone 21.

Figure 10:
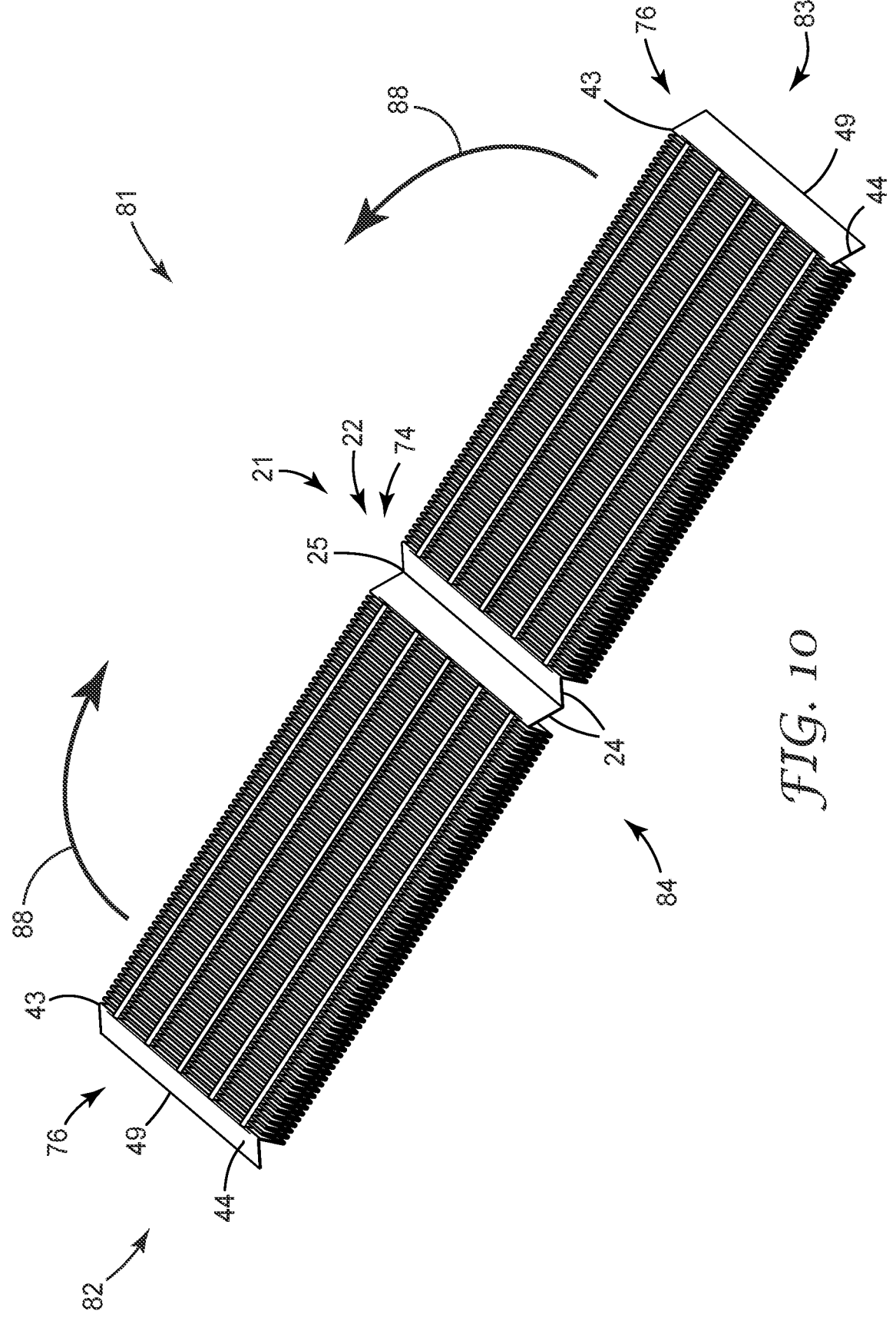
FIG. 10 is a perspective view of an exemplary length of pleated air filter media configured to be formed into an annular, unframed, pleated air filter.

With reference to FIG. 10, a continuous, elongate length of pleated media may be obtained in which in a set of first interruptions 74 are provided in the adhesive strand(s); and, in which a set of second interruptions 76 are also provided in the adhesive strand(s). Interruptions 74 and 76 alternate in succession and are spaced appropriately along the longitudinal axis of the continuous length of pleated media. The first and second interruptions 74 and 76 in the adhesive strands may each span two pleat-panels of the pleated media. The continuous length of media can be cut between two pleat-panels at which one of the second interruptions 76 is located, and can also be cut between two pleat-panels at which another second interruption 76 is located. This will provide a discrete, elongate length 81 of pleated media bearing a single pleat-panel 44 at each end 82 and 83, as depicted in exemplary embodiment in FIG. 10. The ends 82 and 83 of the elongate length 81 of pleated media can be brought together as indicated by arrows 88 in FIG. 10, and the two end pleat-panels 44 can be bonded to each other (e.g., by melt-bonding such as by ultrasonic bonding) to make a joint 10. As illustrated in FIG. 11, this joint 10 (which also serves as a bonded hinge-pleat 42) is comprised of (in this case) two pleat-panels 44 that are bonded together e.g. by melt-bonds 47.

Such a procedure can provide an annular air filter 1 with a first (integral) preferred-bending zone 21 corresponding to the first interruption 74 in the adhesive strand(s) and with a second preferred-bending zone 41 corresponding to the second interruption 76, as indicated in FIG. 11. Such a second preferred-bending zone 41, which is formed by joining together (at least) two pleat-panels 44 that were not already directly integrally connected to each other, to make a joint that coincides with an interruption 76 in the adhesive strand(s) 70, will be termed a "jointed, non-integral" preferred-bending zone 41, to distinguish it from the above-described integral preferred-bending zone 21.

The two pleat-panels 24 that form the integral preferred-bending zone 21 can of course be bonded to each other (e.g.

in very similar manner as pleat-panels 44 are bonded to each other) to form a first, integral hinge-pleat 22 and integral preferred-bending zone 21. In other words, pleat-panels 24 may be subjected to a "joining" or "seaming" operation in similar manner as pleat-panels 44, notwithstanding that pleat-panels 24 are already integrally connected to each other at their mutual pleat tip 25.

The resulting air filter will have an arrangement of the general type depicted in FIG. 11. In FIG. 11, the integral preferred-bending zone 21, and integral hinge-pleat 22 and other components and features thereof, will be very similar as those already described. The second preferred-bending zone 41 is a jointed, non-integral preferred-bending zone. Many of its components and features may resemble those of the first, integral preferred-bending zone 21. For example, it may comprise a bonded hinge-pleat 42 that comprises first and second pleat-panels 44. The hinge-pleat 42 may be flanked by inward pleat tips 43 with the adhesive strand(s) 70 being interrupted in the general manner described earlier herein, e.g. so that the strands do not penetrate substantially into the inward pleat valley 46 of the hinge-pleat 42. The pleat-panels 44 may be brought together to that the inward pleat valley 46 exhibits an extremely small (e.g., essentially zero-degree) inward valley angle, with the pleat-panels 44 being bonded together e.g. via melt-bonds 47, in similar manner as described earlier. (As usual, FIG. 11 is an exemplary representation; in actuality, pleat-panels 44 will likely be bonded directly to each other rather than any gaps existing therebetween.) The bonded hinge-pleat 42 may be flanked by outward pleat valleys 48 that exhibit a large outward valley angle, in similar manner as described earlier.

Thus in many aspects, a jointed, non-integral preferred-bending zone 41 may resemble the previously-described integral preferred-bending zone 21. In some embodiments, the main distinguishing characteristic may lie in a difference between the outer end 45 of a hinge-pleat 42 of a jointed, non-integral preferred-bending zone 41 and the outer end of a hinge-pleat 22 of an integral preferred-bending zone 21. For the former, its two pleat-panels 44 are not integrally connected at their outer ends; rather, they each have an outer cut edge 49 that is not integrally connected to the outer cut edge 49 of the other pleat-panel. (This outer cut edge 49 corresponds to the location at which the original, continuous length of pleated filter media was cut into a discrete segment 81.) These pleat-panels 44 with outer cut edges 49 that are not connected to each other are contrasted with the pleat-panels 24 of hinge-pleat 22, which are integrally connected to each other at their common pleat tip 25. To make this distinction clear (noting that these features and their differences can be seen most easily in FIG. 11), the outer terminus of integral hinge-pleat 22 will be referred to as a pleat "tip" 25 whereas the outer terminus of non-integral hinge-pleat 42 will be referred to as a pleat "end" 45. It is also noted that the panels 44 of the non-integral hinge-pleat 42, not being integrally connected to each other at a common pleat tip, do not constitute a pleat in the strict sense. However, for ease of description, two (or more) such panels, as bonded together, will nevertheless be referred to herein as a hinge-"pleat". (Again, the entities described herein as hinge-pleats may alternatively be described as hinge-flaps.)

Figure 12:
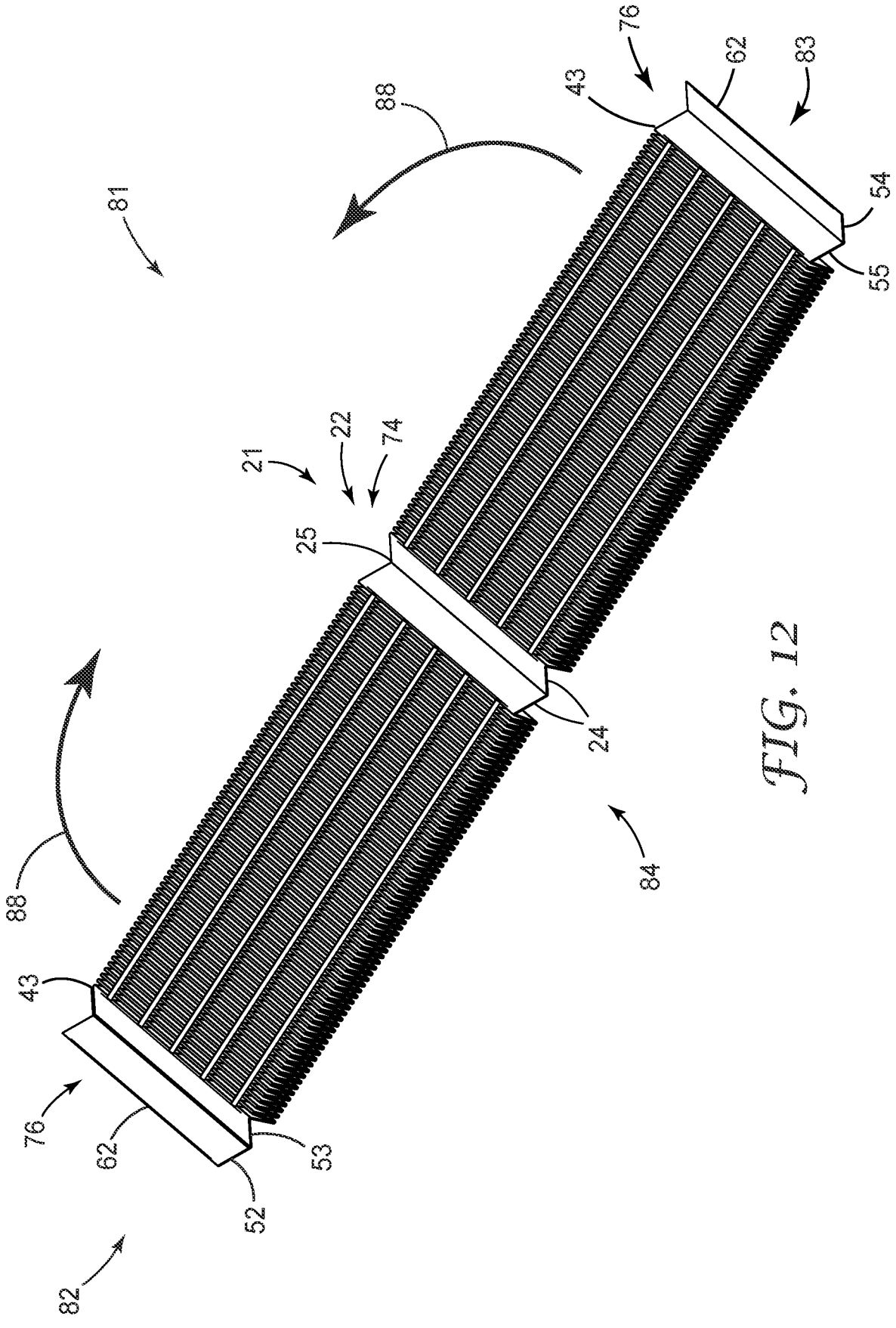
FIG. 12 is a perspective view of another exemplary length of pleated air filter media configured to be formed into an annular, unframed, pleated air filter.

In arrangements of the general type described above, a joint 10 can be formed between (at least two) pleat-panels, with the joint also serving as a non-integral, bonded hinge-pleat that provides a jointed, non-integral preferred-bending zone. A variation within such arrangements (having to do with how many pleat-panels are present in a non-integral hinge-pleat of a non-integral preferred-bending zone 41) can be discussed with reference to FIGS. 12 and 13. A continuous, elongate length of pleated air filter media may be obtained, with adhesive strands 70, and with a first set of interruptions 74 in the adhesive strands being provided as described above. These interruptions 74 in the adhesive strands each span two consecutive pleat-panels 24, as shown in FIG. 12 (and in the same manner as described with regard to FIGS. 10 and 11). Another, second set of interruptions 76 is provided in the adhesive strands, interspersed with the first interruptions 74 in an alternating manner and spaced appropriately. The second set of interruptions 76 each span four pleat-panels (52, 53, 54 and 55) rather than two pleat-panels (44) as in the arrangement described above with respect to FIGS. 10 and 11.

Figure 13:
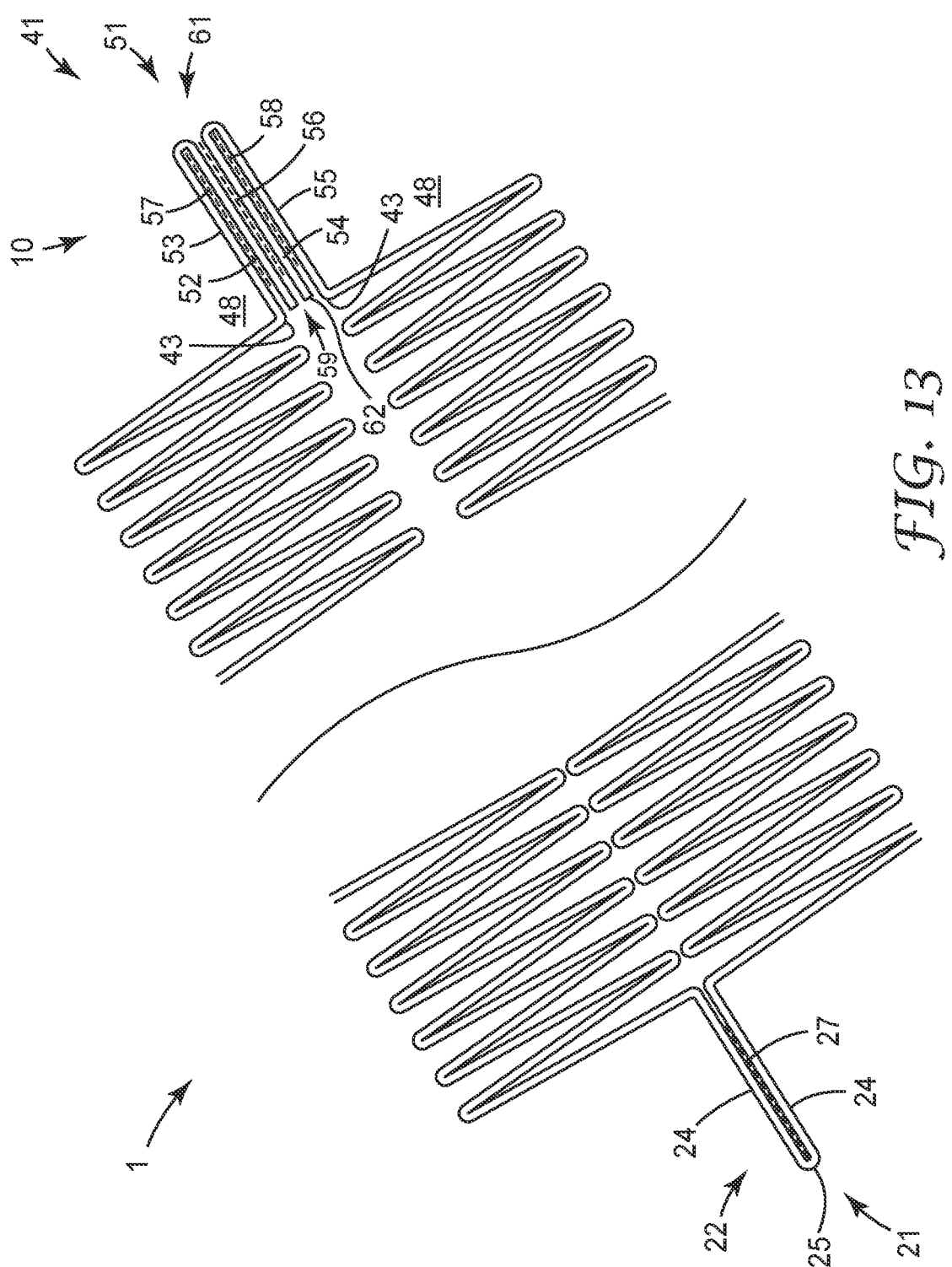
FIG. 13 is a plan view of portions of another exemplary air filter, viewed along a transverse axis/pleat direction of the air filter with the air filter and media in a flattened shape, and depicting a first, integral preferred bending zone and a second, jointed, non-integral preferred bending zone.

The continuous length of pleated filter media is then cut in the center of one of the four pleat-panel segments that corresponds to one interruption 76 and is also cut in the center of another of the four pleat-panel segments that corresponds to another interruption 76. This will provide a discrete elongate length 81 of air filter media 80 as shown in FIG. 12. The first and second ends 82 and 83 of the length of filter media are curved and brought together as indicated by arrows 88 of FIG. 12. All four of pleat-panels 52-55 are gathered together and subjected to melt-bonding. This provides an arrangement as shown in FIG. 13, in which the thus-formed bonded hinge-pleat 51 (which is also joint 10) comprises all four of the pleat-panels 52-55. Pleat-panels 52 and 54, which were not integrally connected to each other, are now melt-bonded together by melt-bonds 56. Pleat-panels 52 and 53, which were already integrally connected to each other, are now also melt-bonded together by melt-bonds 57; already-integral pleat-panels 54 and 55 are likewise melt-bonded together by melt-bonds 58. (As usual, FIG. 13 is an exemplary representation; in actuality, the various pleat-panels will likely be bonded directly to each other rather than any gaps existing therebetween.) The edges 62 at which the continuous length of pleated media was originally cut, now face inwards; the outward end 61 of the hinge-pleat 51 is defined by the pleat tip that integrally connects pleat-panels 52 and 53 and by the pleat tip that integrally connects pleat-panels 54 and 55.

Such a hinge-pleat 51 will be termed a many-layer hinge-pleat, which is defined to mean that the hinge-pleat has more than two layers, derived from more than two pleat-panels. For purposes of characterization, an inward pleat valley 59 of a many-layer hinge-pleat 51 can be considered to be the "valley" that results from the combination of all of the layers. In any event, such an inward pleat valley 59 will often be extremely small (e.g. exhibiting an aggregate pleat valley angle that is essentially zero). As usual, any adhesive strands 70 will have interruptions 76 e.g. so that the strands do not penetrate substantially beyond the inward pleat tips 43 that flank the many-layer hinge-pleat 51.

In many aspects a jointed, non-integral preferred-bending zone 41 comprising a many-layered non-integral bonded hinge-pleat 51 of the general type depicted in FIG. 13 will perform similarly to a jointed, non-integral preferred bending zone 41 that comprises a (two-layered) non-integral hinge-pleat 42 of the general type depicted in FIG. 11. With the design of FIG. 13, the hinge-pleat 42 (and joint 10) may be slightly stiffer due to the greater number of layers. However, this is not expected to significantly affect the ability of the flanking pleat-panels to bend relative to the hinge-pleat itself; in other words, this should not affect the ability to put the filter into a flattened configuration. In various embodiments, either of these general arrangements may be used; with some processing equipment, use of the many-layered design may make it slightly easier to perform the cutting of the continuous length of pleated filter media into discrete segments.

As described above with respect to FIGS. 10 and 11, in the embodiment of FIGS. 12 and 13 the two pleat-panels 24 that form the integral preferred-bending zone 21 can be bonded to each other e.g. by melt-bonding. As evident from comparison of FIGS. 10 and 12, and from comparison of FIGS. 11 and 13, the integral preferred-bending zones 21 (and their integral, bonded hinge-pleats 22) are substantially identical in the depicted embodiments of FIGS. 10-13 (being formed of two pleat-panels 24 that are bonded together).

Other variations are possible. Thus for example, in a many-layered hinge-pleat, the pleat-panels 52, 53, 54 and 55 may be nested (e.g. with pleat-panels 52 and 53 nested within the "V" of pleat-panels 54 and 55, or vice versa) and bonded together in that configuration. If desired, more than four (e.g. six) pleat-panels may be devoted to a hinge-pleat and joint, with the interruptions in the adhesive strands being extended commensurately. Similarly, if desired, an integral preferred-bending zone 21, and its integral hinge-pleat 22, may comprise more than the two pleat-panels 24 that are depicted in FIGS. 10-13. Rather, in some embodiments, four, six, or even more pleat-panels may be gathered and bonded together to form an integral hinge-pleat; with, in such a case, the interruptions 74 in the adhesive strands being commensurately set to span the desired number of pleat-panels.

The above discussions have focused on arrangements in which a first preferred-bending zone of an air filter is an integral preferred-bending zone and a second preferred-bending zone of the air filter is a non-integral, jointed, preferred-bending zone. However, this is not necessarily required. Rather, in some embodiments, both of the preferred-bending zones of an air filter may be non-integral, e.g. jointed, preferred-bending zones. This may be achieved e.g. by a slightly modified version of the above-discussed assembly methods. For example, rather than a single discrete elongate length of pleated filter media having its two ends brought together and bonded to form a single jointed non-integral preferred-bending zone (with the other preferred-bending zone being an integral preferred-bending zone), two discrete elongate lengths of pleated filter media may be obtained. The two ends of the first elongate length of filter media may be bonded to the two ends of the second elongate length of filter media, to form an annular air filter with two jointed, non-integral preferred-bending zones. Such an air filter may not have any integral preferred-bending zones. Regardless of the nature of the preferred-bending zones, the zones will be diametrically opposite each other, to promote the ability to compact, e.g. flatten, the air filter.

The herein-disclosed arrangements of preferred-bending zones can provide pleated air filters 1 that are long-term stable, even upon exposure to elevated temperatures while in a compacted condition. In at least some embodiments, such filters may be provided in a flattened shape, e.g. without any spacer being present, for further space-savings and/or cost-savings. Still further, the combination of adhesive strands in bridging arrangements in the majority of the pleat valleys, and the bonding as established in the other pleat valleys (e.g. those of bonded hinge-pleats), can ensure that in at least some embodiments, all of the inward pleat valleys of the air filter are non-expandable. In this context, non-expandable is defined as meaning that the inward pleat tips that bracket an inward pleat valley will not expand beyond e.g. 120% of a nominal, predetermined pleat tip spacing that is established for the inward pleat tips of the air filter. (As usual, slight statistical deviations may occur, hence the limit is established at 120%.) This can provide that the air filter will exhibit a stable, well-defined inner diameter that exhibits excellent aesthetics and that can ensure a snug fit onto an appropriately sized mandrel of e.g. a room air purifier.

It will be further appreciated that the approaches presented herein allow apparatus and processes that can be used to form an annular pleated air filter, to be conveniently leveraged to advantage. As discussed earlier, an adhesive-deposition apparatus may be used to deposit adhesive strands in an intermittent manner. According to the arrangements herein, the adhesive-deposition apparatus may be configured to also impart periodic interruptions (that are superimposed on the intermittent pattern) to provide first and second preferred-bending zones. Moreover, a bonding apparatus (sometimes referred to as a "seaming" apparatus) may be used to bond end pleat-panels of a discrete length of pleated media together to form a joint which can also serves as a non-integral bonded hinge-pleat that provides a jointed, non-integral preferred-bending zone. Such a bonding apparatus may also be used to bond two or more integrally-connected pleat-panels together to form an integral bonded hinge-pleat that provides an integral preferred-bending zone. Both bonding operations may be performed in very similar manner excepting that the latter does not require non-integral pleat-panels at opposite ends of the discrete length of filter media to be brought together for bonding; rather, the already-integrally-connected pleat panels merely need to be brought into the bonding apparatus.

Removal Tabs

In some embodiments, air filter 1 may comprise at least one removal tab 91 and/or 93 that can be grasped in order to slidably remove the air filter e.g. from a mandrel 105. Thus in some embodiments a user may simply grasp the one or more removal tabs and pull upward to slidably move the air filter upward off of mandrel 105. In some embodiments, any such removal tab may be located at a location other than the upper and lower ends of the air filter (e.g. so that the tab does not interfere with abutting corrugated edges of the pleated filter media against resilient gaskets of the room air purifier as discussed elsewhere herein). Thus in some embodiments, the one or more removal tabs may be located in a generally central portion of the air filter (along the transverse axis/pleat direction of the air filter) as evident in FIG. 1. In the depicted embodiment of FIG. 1, two such removal tabs 91 and 93 are visible, at generally diametrically opposed locations of the radially outward surface of the air filter. In some embodiments a tab may be an identification tab, e.g. that includes filter information (product number, re-ordering information, any relevant regulatory information, and so on). In some embodiments a tab may serve as both a removal tab and as an identification tab.

Any such tab may be non-removably attached to the pleated filter media, e.g. by way of being ultrasonically bonded to a panel of the pleated filter media. In some embodiments, such a tab may protrude radially outward from the pleated filter media and may be rather stiff; this can provide that the airflow does not urge the tab flush against the filter media in a way that might locally occlude an area of the filter media. In some embodiments, the tab (e.g. even if rather stiff) may be made of a highly air-transmissive material (e.g. a netting or a highly porous nonwoven) so that even if the tab does become situated flush against the filter media, the effect on the filtration may be minimal.

In some convenient embodiments, a removal tab 91 may be bonded to at least one pleat-panel of an integral hinge-pleat 22, and a second removal tab 93 may be bonded to at least one pleat-panel of a jointed, non-integral hinge-pleat 42 (or 51) to provide an arrangement of the general type depicted in FIG. 1. This is particularly convenient in that the removal tabs should ideally be located diametrically opposite each other for ease of use, and the hinge-pleats are already positioned in such a diametrically-opposite configuration and thus provide ideal locations for the removal tabs. To achieve such arrangements, each tab may be brought into the bonding apparatus along with the desired pleat-panels, with the pleat-panels being melt-bonded together, and the tab being melt-bonded to at least one of the pleat-panels, in a single operation. Removal tabs formed in this manner will be referred to as being co-bonded with the one or more pleat-panels.

It will thus be appreciated that in at least some embodiments the arrangements disclosed herein allow the formation of an annular pleated air filter having a first preferred-bending zone, having a second preferred-bending zone that also includes a joint by which the annular shape is obtained, optionally having removal tabs at the preferred-bending zones, and that is compactable and, in some embodiments, is flattenable. All this can be achieved while without requiring major modifications to apparatus that are configured to produce pleated filter media, to apply adhesive strands to the pleated media, and to form lengths of the pleated media into annular air filters.

Room Air Purifier

Figure 4:
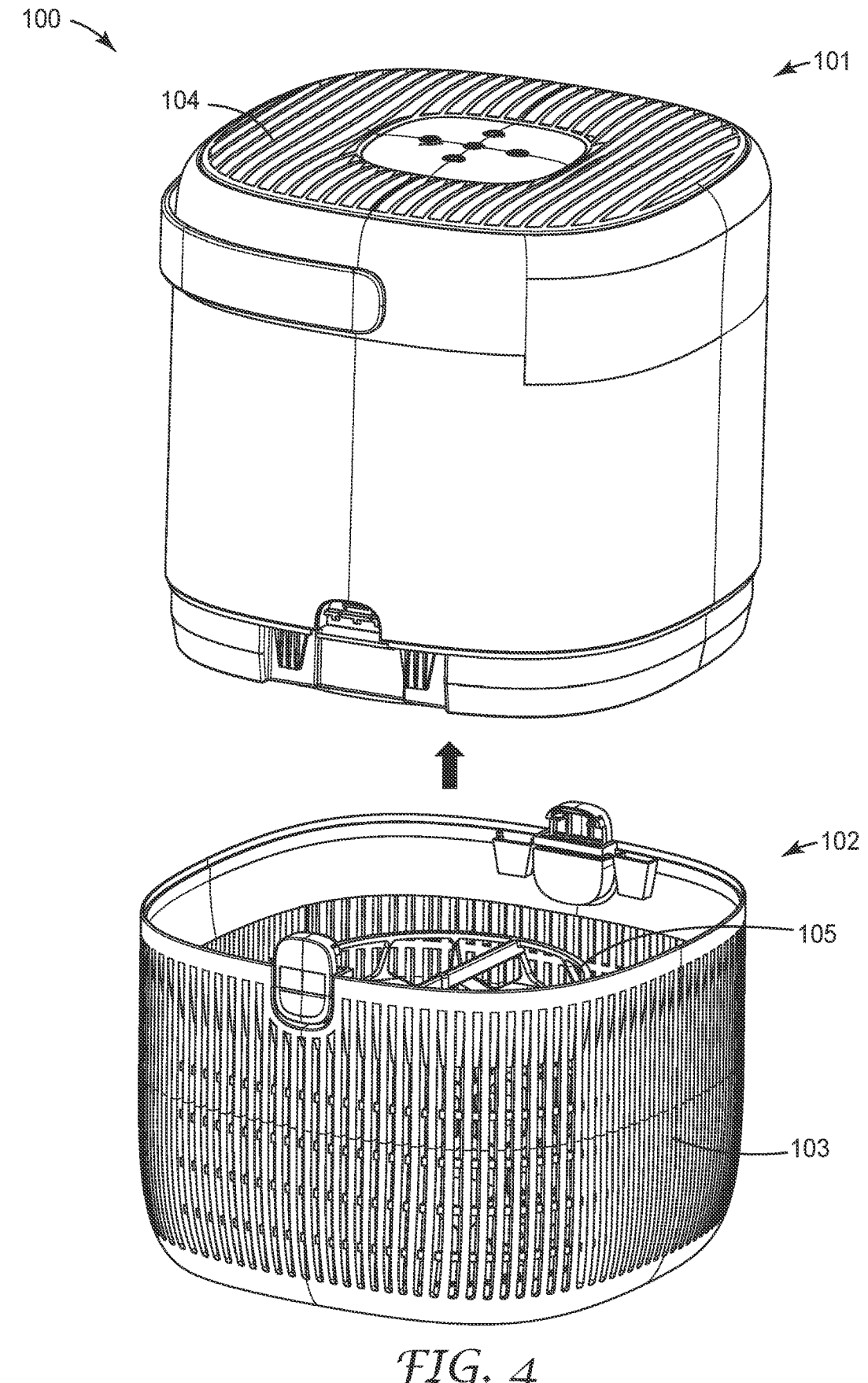
FIG. 4 is a perspective, partially-exploded view of an exemplary room air purifier with which an air filter as disclosed herein may be used.

Shown in FIG. 4 in perspective view is an exemplary powered room air purifier 100 in which an air filter as disclosed herein may be installed. A room air purifier is an electrically powered apparatus (often portable) that can be placed within a room and can be operated to pull room air into the purifier, to filter the air (e.g. to remove at least particles, and potentially other materials, therefrom) through an air filter that is removably installed in the purifier, and to return the air to the room. As such, a room air purifier is distinguished from e.g. an HVAC system that performs heating and/or cooling of the air, from apparatus that filter liquids such as water, and so on. While some amount of particles may be captured on an air filter of a room air purifier, a room air purifier is not configured to capture and accumulate large quantities of debris in a designated receptacle. As such, a room air purifier, and an air filter configured for use in a room air purifier, is distinguished from vacuum cleaners, e.g. from cylindrical vacuum cleaners such as the well-known wet-or-dry vacuum cleaners available under the trade designation SHOP-VAC.

A room air purifier 100 will include a housing defining at least one ambient-air inlet 103, at least one filtered-air outlet 104, and an airflow path therebetween. Such a room air purifier will often exhibit a longitudinal axis that, when the room air purifier is positioned for ordinary operation, will at least generally coincide with a vertical axis as defined by Earth's gravity. In some embodiments, such a room air purifier 100 may be comprised of upper and lower portions 101 and 102 that, as joined together, form room air purifier 100 and are separable from each other in order to change (or install) an air filter in the room air purifier. In some convenient embodiments, the upper and lower housing portions may be detachably attached to each other by way of one or more latches. Room air purifiers of this general type are disclosed in U.S. Provisional Patent Application No. 63/330,874, entitled "ROOM AIR PURIFIER WITH INTEGRATED GASKETS", and in the resulting U.S. patent application Ser. No. 18/130,284, filed Apr. 3, 2023, both of which are incorporated by reference in their entirety herein. In some embodiments, a room air purifier may be comprised of a major portion and a door or panel that is openable in order to install the air filter into the major portion of the room air purifier. Room air purifiers of this general type are disclosed in U.S. Provisional Patent Application No. 63/331, 024, entitled "COMPACT ROOM AIR PURIFIER WITH INTEGRATED GASKETS", and in the resulting U.S. patent application Ser. No. 18/130,128, filed April both of which are incorporated by reference in their entirety herein.

Room air purifier 100 will comprise an airflow path therethrough. Ambient air will enter air inlet 103, will pass into an unfiltered-air space, and from there will pass through the air filter 1 that is disposed on e.g. a mandrel 105 within the room air purifier. After passing through air filter 1 and the mandrel, the air (now having been filtered) will exit through air outlet 104. The air inlet and air outlet may be at any suitable location and in any suitable number; the terms inlet and outlet are used broadly, and encompass arrangements ranging from e.g. a single large orifice to a large number of individual apertures. Room air purifier 100 includes at least one fan that motivates ambient air to enter the room air purifier and pass through the air filter 1 installed therein and to exit the room air purifier as filtered air. By definition, room air purifier 100 is a powered room air purifier, meaning that the fan is driven by electric power, possibly from an internal power source (e.g. battery) but more typically delivered through a cord from an external power source. Control circuitry of the room air purifier may be of any suitable type and may include any appropriate components. The control circuitry will be in operative connection with the fan (e.g. so that the fan can be turned on and off and operated at different speeds if desired) and will also be in operative connection with various controls and switches, monitors, displays and/or indicators, external devices, etc., that allow a user to directly or remotely operate room air purifier 100.

A room air purifier 100 with which a herein-disclosed air filter is used, may comprise a support mandrel 105 (as illustrated in FIG. 4) that is generally cylindrical in shape and is configured with a radially outward surface to receive and support an opened air filter 1. Such a mandrel may comprise at least a portion that makes up a majority of the area of the mandrel (e.g. that occupies up at least 70, 80, 90, or 95% of the vertical height of the mandrel) and that is discontinuous so as to be highly air-transmissive. In many convenient embodiments, such a portion may take the general form of a "lattice" that is air-transmissive by way of comprising solid members that are interspersed between through-openings. In some embodiments, installation of an opened air filter 1 onto the mandrel may involve slidably moving the opened air filter 1 onto the mandrel. This will be preceded by disassembling the room air purifier into its separate (e.g. upper and lower portions 101 and 102), or opening a door or panel in the room air purifier, so that the mandrel is accessible. Also, the air filter 1 being provided in a compacted, e.g. flattened, shape as discussed earlier herein, it will be opened to its ready-for-use shape in order to be slidably installed onto the mandrel. When opened and slidably installed onto the mandrel 105, the air filter 1 will be positioned radially-outwardly of the radially-outward surface of the mandrel. In some embodiments, at least some portions of at least some radially-inward pleat tips 7 of the air filter may be in contact with, e.g. abut against, the radially-outward surface of the mandrel. However, in many embodiments, radially-inward surfaces of previously-described adhesive strand sections 77 that reside on the radially-inward pleat tips 7 of air filter 1, may be the components of the air filter that are in actual contact with the radially-outward surface of the mandrel.

In some embodiments, a room air purifier 100 may comprise first and second resilient gaskets, e.g. an integrated, resilient upper gasket and an integrated, resilient lower gasket. By integrated is meant that the gaskets are components (e.g. permanent or at least quasi-permanent components, as discussed below) of the room air purifier 100 rather than being components of the air filter 1 that is installed into the room air purifier 100. In many embodiments, these gaskets may be attached, e.g. at least quasi-permanently attached, to room air purifier 100 so that they cannot be removed therefrom. An upper gasket may be positioned so that when a pleated air filter 1 is disposed on the mandrel, an upper corrugated edge of the pleated air filter is abutted against a lower surface of the upper gasket; similarly, a lower gasket may be positioned so that a lower corrugated edge of the pleated air filter is abutted against an upper surface of the lower gasket. The room air purifier, the integrated, resilient gaskets of the room air purifier, and the pleated air filter, will be configured so that when the air filter is installed within the room air purifier, the upper and lower corrugated edges of the air filter will be respectively pressed against the lower and upper surfaces of the upper and lower resilient gaskets, to at least substantially prevent leakage of unfiltered air around the upper and lower corrugated edges of the air filter. The upper and lower portions of the room air purifier can then be held together (or, a door or panel of the room air purifier can be held shut) e.g. by one or more latches, in a way that causes the desired compression to be maintained indefinitely. The use of resilient gaskets in this general manner, and the advantages that accrue, are discussed in detail in the above-mentioned '874 and '024 U.S. Provisional Patent Applications and in the respective resulting International (PCT) Applications.

Filter media 80 may be comprised of nearly any material, in any configuration, that is capable of filtering moving air. Such media may include, but is not limited to, fibrous materials (e.g., nonwoven webs, fiberglass webs, and so on), porous membranes, and so on. In particular embodiments, the filter media may include at least one layer that comprises at least some material that can be electrically charged to form an electret material. In particular embodiments, the filter media may be a multilayer media that comprises at least one layer that includes an electret material, and at least one layer that includes a sorbent material. In some embodiments filter media 80 may comprise at least one layer capable of HEPA filtration. In particular embodiments filter media 80 may comprise a prefilter layer e.g. in combination with an electret layer that is capable of HEPA filtration. In some embodiments a multilayer filter media may comprise a layer (e.g. a spunbonded layer) that serves primarily to enhance the stiffness and pleatability of the multilayer media; such a layer may not necessarily play a significant role in performing filtration.

If at least one layer of the filter media 80 is to be charged, this may be done by any suitable method, for example, by imparting electric charge to the nonwoven web using water as taught in U.S. Pat. No. 5,496,507. Nonwoven electret webs may also be produced by corona charging as described in U.S. Pat. No. 4,588,537, or using mechanical approaches to impart an electric charge to fibers as described in U.S. Pat. No. 4,798,850. Any combination of such approaches may be used. In various embodiments, the filter media may exhibit a Percent Penetration (of airborne particles, testing using Dioctyl Phthalate as a challenge material, and tested according to the general methods described in U.S. Pat. No. 7,947,142) of less than about 20, 10, 5, 1, 0.1, or 0.03. In many embodiments, the filter media will comprise at least one layer that is configured to capture particles (e.g. by way of including electrets as discussed above).

The pleated filter media 80 can exhibit any suitable thickness. By thickness is meant the local thickness of the filter media material itself, rather than an overall "thickness" of the pleated media (such an overall thickness will often correspond to the pleat height as described above). In various embodiments, the (local) thickness of the pleated filter media may be less than or equal to 3.0, 2.5, 2.0, 1.5, or 1.0 mm. In further embodiments, this thickness may be greater than or equal to 0.1, 0.2, 0.5, or 0.8 mm.

As noted above, in many embodiments the pleat direction ($P_D$) of the pleated media 80 will be at least generally aligned with a vertical axis of a room air purifier 100 into which the air filter is installed. In some particular embodiments, the air filter 1 may be installed in the room air purifier 100 so that a compressive force that is applied to the corrugated edges of the pleated filter media will be aligned with the pleat direction of the pleated media. It will be appreciated that having the pleat direction aligned with the compressive force in this manner will allow the pleated media to exhibit substantial stiffness and resistance to buckling under the compressive force. (This can be contrasted with the previously-discussed ability of the pleated media to be "compacted" in a radially inward direction.) Using a fairly tight pleat spacing (e.g. a nominal pleat spacing of e.g. 3.0-5.0 mm as discussed elsewhere herein) can further enhance this ability.

In some embodiments it may be helpful for the filter media to exhibit sufficient "inherent" stiffness (this may be measured e.g. on unpleated filter media, or on a single panel of the pleated material, between score lines, so as to not be affected by any folds or scores that have been imparted to the material). In various embodiments, the filter media may exhibit a Gurley Stiffness of at least 200, 300, 400, 600, 800, or 1000 mg (which is the customary unit for Gurley Stiffness). The Gurley Stiffness will be measured according to the procedures described in U.S. Provisional Patent Application 62/986,300 and in the resulting International (PCT) Application Published as International Patent Application Publication WO 2021/176291, the relevant sections of both of which are incorporated by reference herein.

In at least some embodiments, air filter 1 and filter media 80 thereof will be disposable. The term disposable is used in general to denote that the air filter is removed after use (e.g. when the filter is judged to be nearing the end of its usable lifetime) rather than remaining permanently in the room air purifier or being removed, cleaned and reinstalled in the room air purifier. As such, the term disposable encompasses air filters that are recyclable, compostable, and so on.

If at least one layer of the filter media 80 is to exhibit sorbent functionality, any suitable sorbent(s), in any convenient physical form, may be included in such a layer. In some embodiments, the sorbent includes at least some activated carbon, e.g. that is treated to enhance its ability to capture odors in general, and/or to capture formaldehyde in particular. Suitable treatments may e.g. provide the activated carbon with at least some amine functionality and/or at least some manganate functionality and/or at least some iodide functionality. Specific examples of treated activated carbons that may be suitable include those that have been treated with e.g. potassium permanganate, urea, urea/phosphoric acid, and/or potassium iodide. Other sorbents that may be potentially suitable e.g. for removing formaldehyde include e.g. treated zeolites and treated activated alumina. Such materials may be included e.g. along with treated activated carbon if desired. In particular embodiments, the sorbent may include materials described in U.S. patent Ser. No. 10/780,416, which is incorporated by reference in its entirety herein.

The one or more sorbents may be provided in any usable form; for example as particles, which may be e.g. powder, beads, flakes, whiskers, granules or agglomerates. The sorbent particle size may vary as desired. The sorbent particles may be incorporated into or onto a layer of filter media 80 in any desired fashion. For example, in various embodiments the sorbent particles may be physically entangled with fibers of a layer of filter media 80, may be adhesively bonded to such fibers, or some combination of both mechanisms may be used.

In some embodiments a sorbent-loaded layer may be a layer that is pleated along with a particle-filtration media. For example, a sorbent-loaded layer may be joined to a particle-filtration layer with the resulting multilayer filter media then being pleated. In other embodiments, an unpleated sorbent-loaded layer may be provided (e.g. as a hollow cylinder or sleeve) and may be disposed radially inwardly of pleated filter media 80, e.g. with the sorbent-loaded layer being bonded at least to some of the radially-inward pleat tips 7. In such an arrangement, the radially-inward surface of the sorbent-loaded layer will define the radially-inward side of the air filter, will define air space 4 within the air filter, and will be the surface of the air filter that is in contact with the radially-outward surface of a mandrel 105 (In such a case, the unpleated sorbent-loaded layer will be disregarded in computing the various pleating parameters discussed earlier herein.) In some embodiments, a sorbent-loaded layer in the form of a hollow cylinder or sleeve (or, in general, any hollow cylinder or sleeve that is desired to be positioned radially inwardly of the pleated filter media 80, for any purpose) may be equipped with preferential-bending zones that are aligned with the previously-described preferred-bending zones of the air filter. This may be achieved e.g. by creasing, scoring, or otherwise imparting a zone of preferential folding, into the cylinder or sleeve.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein, this specification as written will control.

What is claimed is:

1. A disposable, annular, unframed, pleated air filter, the air filter being configured to be in a compacted shape and being openable to a generally cylindrical, ready-for-use shape, and the air filter comprising:

a length of pleated air filter media comprising a longitudinal axis and comprising at least one joint so that the length of pleated air filter media is in a continuous annular shape, the pleated air filter media further comprising a transverse axis and exhibiting a pleat direction that is at least generally aligned with the transverse axis, and the pleated air filter media comprising an inward side with inward pleat tips and inward pleat valleys and an outward side with outward pleat tips and outward pleat valleys;
   and,
   at least one adhesive strand that is on the inward side of the length of pleated air filter media and is disposed on the inward pleat tips and penetrates at least partially into at least some of the inward pleat valleys;
      wherein the length of pleated air filter media comprises a first preferred-bending zone and a second preferred-bending zone that is located diametrically opposite the first preferred-bending zone along the longitudinal axis of the pleated air filter media,
      wherein the at least one adhesive strand comprises a first interruption at the first preferred-bending zone and comprises a second interruption at the second preferred-bending zone,
      wherein at least one of the first and second preferred-bending zones is a jointed, non-integral preferred bending zone that is located at the at least one joint,
      wherein the at least one joint is a single joint and wherein the first preferred-bending zone is an integral preferred-bending zone and the second preferred-bending zone is a jointed, non-integral preferred bending zone that is located at the single joint,
      wherein the first, integral preferred-bending zone comprises a first, integral hinge-pleat with an outward pleat tip and with an inward pleat valley that is flanked by first and second flanking inward pleat tips,
      wherein the first, integral hinge-pleat comprises first and second integral pleat-panels and wherein the first and second integral pleat-panels are non-separably bonded to each other in a bonding zone of each pleat-panel, so that the first, integral hinge-pleat is a bonded hinge-pleat,
      and
      wherein a non-integral tab is provided at the first, integral bonded hinge-pleat by way of being co-bonded to at least one of the first and second integral pleat-panels of the first, integral bonded hinge-pleat by the same bonding mechanism by which the first and second integral pleat-panels are bonded to each other to form the first, integral bonded hinge-pleat.

2. The air filter of claim 1 wherein the first interruption of the at least one adhesive strand is configured so that the at least one adhesive strand does not extend beyond the first and second flanking inward pleat tips substantially into the inward pleat valley of the first, integral hinge-pleat.

3. The air filter of claim 1 wherein when the air filter is in the generally cylindrical, ready-for-use shape, inward pleat valleys other than the inward pleat valley of the hinge-pleat exhibit, on average, a nominal inward valley angle; and, wherein the inward pleat valley of the bonded hinge-pleat exhibits an inward valley angle that is less than 20% of the nominal inward valley angle of the non-hinge-pleat inward pleat valleys.

4. The air filter of claim 1 wherein the second, jointed, non-integral preferred-bending zone comprises a second, jointed, non-integral hinge-pleat with an outward pleat end and with an inward pleat valley that is flanked by first and second flanking inward pleat tips.

5. The air filter of claim 4 wherein the second, jointed, non-integral hinge-pleat comprises at least two non-integral pleat-panels that are non-separably bonded to each other in a bonding zone of each pleat-panel to form the joint, so that the second, jointed, non-integral hinge-pleat is a bonded hinge-pleat.

6. The air filter of claim 5 wherein the second, jointed, non-integral hinge-pleat comprises first and second integral pleat-panels and comprises third and fourth pleat-panels that are integral with each other but not with the first and second integral pleat-panels, and wherein at least the first and second integral pleat panels are non-separably bonded to each other, the third and fourth integral pleat panels are non-separably bonded to each other, and the first and third non-integral pleat-panels are non-separably bonded to each other, in a bonding zone of each pleat-panel to form the joint, so that the second, jointed, non-integral hinge-pleat is a many-layer hinge pleat.

7. The air filter of claim 5 wherein a non-integral tab is provided at the second, jointed, non-integral bonded hinge-pleat by way of being co-bonded to at least one of the at least two non-integral pleat-panels by the same bonding mechanism by which the at least two non-integral pleat-panels are bonded to each other to form the second, jointed, non-integral bonded hinge-pleat.

8. The air filter of claim 1 wherein sections of the at least one adhesive strand that penetrate at least partially into the inward pleat valleys are arranged in a bridging configuration such that in the portions of the inward pleat valleys into which the at least one adhesive strand penetrates, a section of the adhesive strand that is disposed on a first pleat-panel of the inward pleat valley is in contact with, and is non-separably bonded to, a section of the adhesive strand that is disposed on a second, opposing pleat-panel of the inward pleat valley, excepting in inward pleat valleys of the preferred-bending zones, where no such bridging configuration is present.

9. The air filter of claim 8 wherein the sections of the at least one adhesive strand penetrate only partially into the inward pleat valleys so that the at least one adhesive strand exhibits a repeating intermittent pattern that is registered with the pleat pattern of the pleated air filter media, with the first and second interruptions of the at least one adhesive strand at the first preferred-bending zone and at the second preferred-bending zone, being superimposed on the repeating intermittent pattern of the at least one adhesive strand.

10. The air filter of claim 1 wherein the at least one adhesive strand comprises at least four adhesive strands that are parallel to each other and are spaced apart from each other along the pleat direction of the pleated air filter media.

11. The air filter of claim 1 wherein when the air filter is in the compacted shape it exhibits a volumetric compaction ratio of less than or equal to 30%, relative to when the air filter is in the opened, generally cylindrical, ready-for-use shape.

12. The air filter of claim 1 wherein the air filter is in a flattened shape in which it exhibits a volumetric compaction ratio of less than 10%, relative to when the air filter is in the opened, generally cylindrical, ready-for-use shape.

13. The air filter of claim 12 wherein the first preferred-bending zone comprises a first bonded hinge-pleat with an outward pleat tip and wherein first and second outward pleat valleys flank the first bonded hinge-pleat, and wherein when the air filter is in the flattened shape at least one of the first and second outward pleat valleys that flank the first bonded hinge-pleat exhibits an outward valley angle of at least 70 degrees.

14. The air filter of claim 12 wherein the air filter is configured to be packaged in the flattened shape with there being no spacer present within an interior space defined within the air filter.

15. A method of installing the air filter of claim 1 into a room air purifier, the air filter being in a flattened shape in which it exhibits a volumetric compaction ratio of less than 10% relative to when the air filter is in the opened, generally cylindrical, ready-for-use shape, and the method comprising:

opening the air filter from its flattened configuration into the opened, generally cylindrical, ready-for-use shape, and slidably moving the opened air filter onto a generally cylindrical support mandrel of the air filter.

16. A room air purifier with the air filter of claim 1 installed therein, the air filter being in the opened, generally cylindrical, ready-for-use shape and being disposed radially-outwardly on a mandrel of the room air purifier with the pleat direction of the air filter aligned with a vertical axis of the room air purifier.

\* \* \* \* \*